(12) United States Patent
Lou

(10) Patent No.: US 8,136,816 B1
(45) Date of Patent: Mar. 20, 2012

(54) LAMINATED MULTIPLE-LAYERED SPLIT BOOT

(76) Inventor: Eddie York-Shin Lou, Rowland Heights, CA (US)

( * ) Notice: Subject to any disclaimer, the term of this patent is extended or adjusted under 35 U.S.C. 154(b) by 177 days.

(21) Appl. No.: 11/415,714

(22) Filed: May 1, 2006

(51) Int. Cl.
*F16J 3/04* (2006.01)
*F16D 3/84* (2006.01)

(52) U.S. Cl. ........ 277/315; 277/316; 277/630; 277/634; 277/635; 277/636; 403/50

(58) Field of Classification Search .......... 277/634–636, 277/630–632, 315, 316; 403/50; 464/173, 464/175
See application file for complete search history.

(56) References Cited

U.S. PATENT DOCUMENTS

| | | | | |
|---|---|---|---|---|
| 1,885,121 A * | 11/1932 | Loweke | ...................... | 137/493.2 |
| 1,922,431 A * | 8/1933 | Geyer | ........................... | 464/175 |
| 2,411,874 A * | 12/1946 | Golden | .......................... | 29/454 |
| 3,213,764 A * | 10/1965 | Nelson et al. | .................. | 277/636 |
| 3,359,014 A * | 12/1967 | Clements | ........................ | 285/55 |
| 3,368,835 A * | 2/1968 | Hackforth | ....................... | 403/50 |
| 3,381,987 A * | 5/1968 | Husen | ........................... | 403/51 |
| 3,660,213 A * | 5/1972 | Moseley | .......................... | 403/50 |
| 3,849,864 A * | 11/1974 | Plummer | ......................... | 29/454 |
| 3,954,027 A * | 5/1976 | Soderberg et al. | .......... | 74/473.36 |
| 4,218,067 A * | 8/1980 | Halling | .......................... | 277/605 |
| 4,558,869 A * | 12/1985 | Grove et al. | ................... | 277/315 |
| 4,573,693 A * | 3/1986 | Nakata et al. | ................. | 277/636 |
| 4,648,607 A * | 3/1987 | Yamada et al. | ................ | 277/598 |
| 4,676,513 A | 6/1987 | Tiegs et al. | | |
| 4,813,913 A | 3/1989 | Belter | | |
| 4,836,080 A * | 6/1989 | Kite et al. | ........................... | 87/9 |
| 4,967,609 A * | 11/1990 | Takagi et al. | ..................... | 74/18 |
| 5,095,867 A * | 3/1992 | Inamura | ..................... | 123/193.3 |
| 5,182,956 A | 2/1993 | Woodall et al. | | |
| 5,192,085 A * | 3/1993 | McOnie | ......................... | 277/370 |
| 5,222,746 A | 6/1993 | Van Steenbrugge | | |
| 5,273,490 A * | 12/1993 | Stewart et al. | ................. | 464/173 |
| 5,281,464 A * | 1/1994 | Sekioka et al. | ................ | 277/630 |
| 5,403,020 A * | 4/1995 | McOnie | ......................... | 277/390 |
| 5,845,911 A | 12/1998 | Gimino | | |
| 6,139,027 A | 10/2000 | Biekx | | |
| 6,322,085 B1 | 11/2001 | Martin et al. | | |
| 6,386,551 B1 * | 5/2002 | Martin | .......................... | 277/634 |
| 6,409,178 B1 * | 6/2002 | Raden et al. | ................... | 277/592 |
| 6,764,243 B1 | 7/2004 | Inuzuka et al. | | |
| 6,942,223 B2 * | 9/2005 | Wang | ............................. | 277/634 |
| 6,951,336 B2 * | 10/2005 | Martin | .......................... | 277/315 |
| 2005/0059499 A1 * | 3/2005 | Deisinger | ..................... | 464/175 |

* cited by examiner

*Primary Examiner* — Alison Pickard
(74) *Attorney, Agent, or Firm* — Raymond Y. Chan; David and Raymond Patent Firm

(57) ABSTRACT

A multiple layering means of a protective laminated multiple-layered split boot layer assembly, providing both very important qualities of easy installation and reliable boot sealing performance. Easy installation is easy to achieve but the reliable boot sealing performance of substantially high degree of reliable boot sealing performance is very much needed but has eluded many investors until now. Many different solutions and approaches are used, such as multiple layering, reinforcement with fastener such as glue sealant adhesive, reinforcement encircling rings, and appropriately positioning each split boot layer's cut (53) split line, in relationship to the cut (53) of preceding and adjacent split boot layer, with alternating slit (or seam) facing feature, for maximized sealing performance.

10 Claims, 30 Drawing Sheets

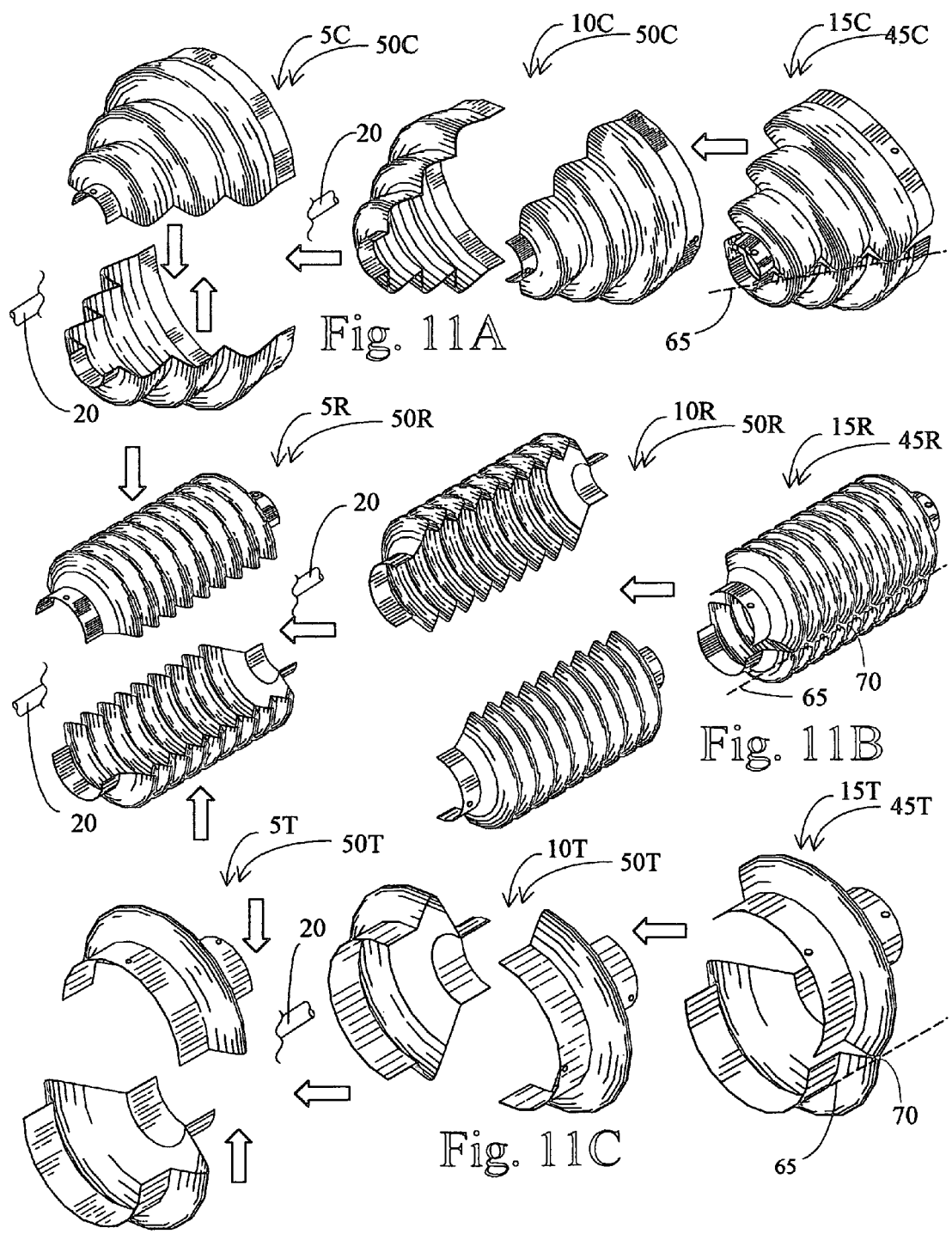

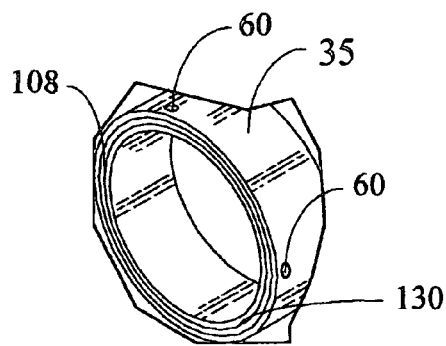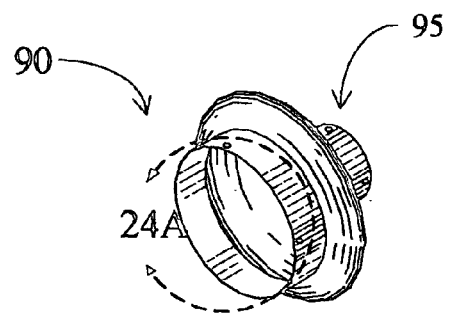
Fig. 24A  Fig. 24B
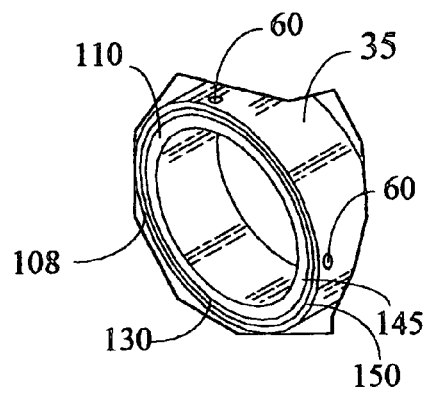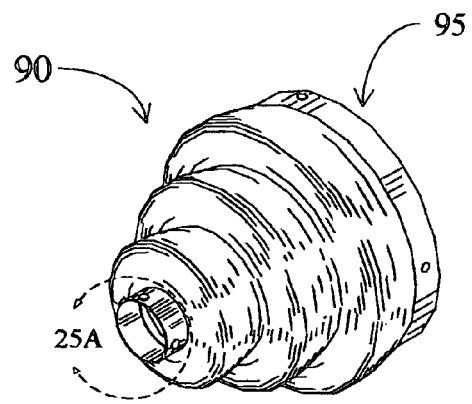
Fig. 25A  Fig. 25B
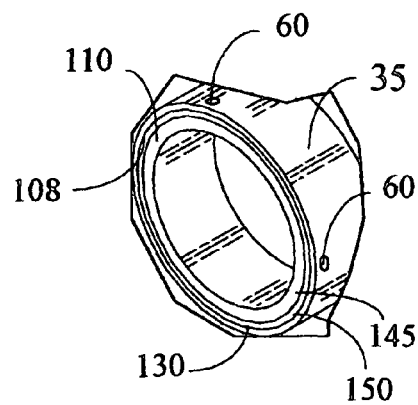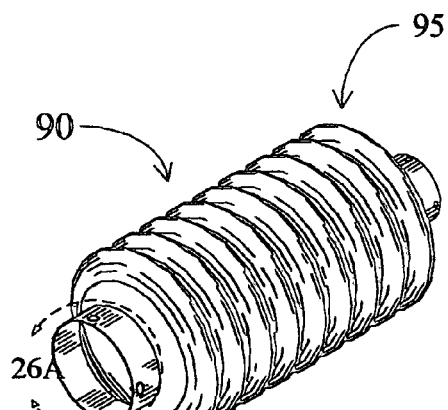
Fig. 26A  Fig. 26B

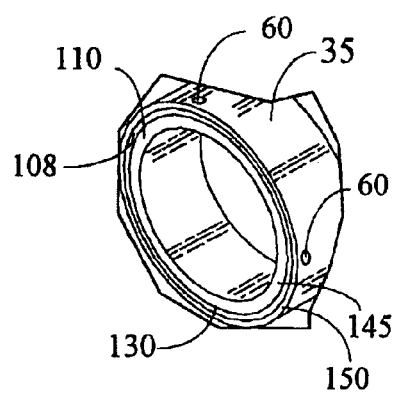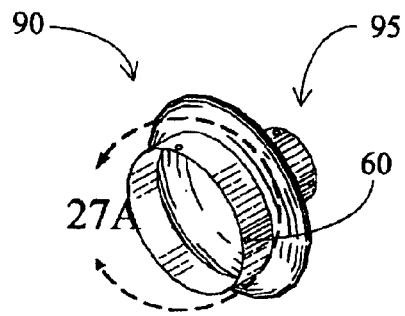
Fig. 27A　　　　　Fig. 27B
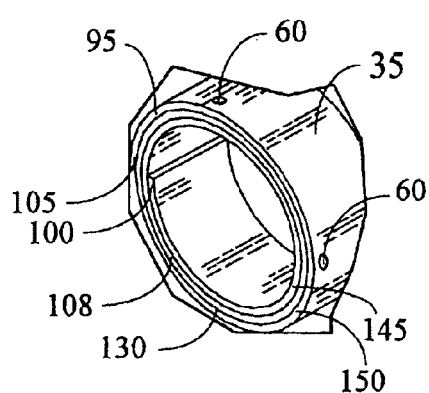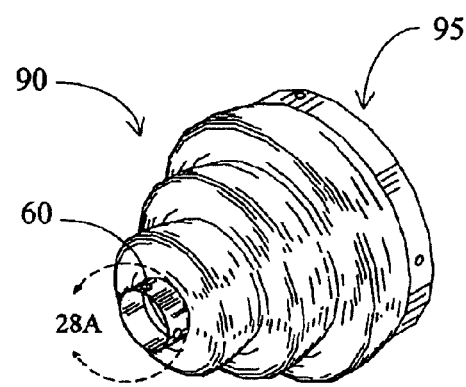
Fig. 28A　　　　　Fig. 28B
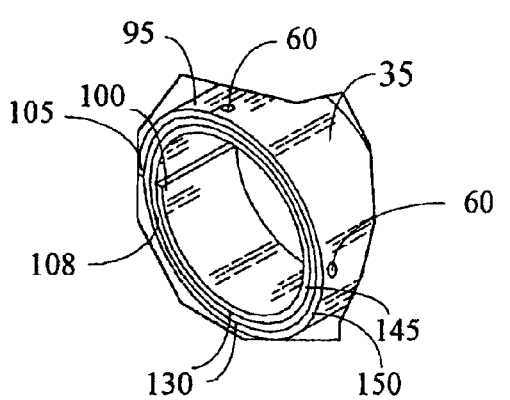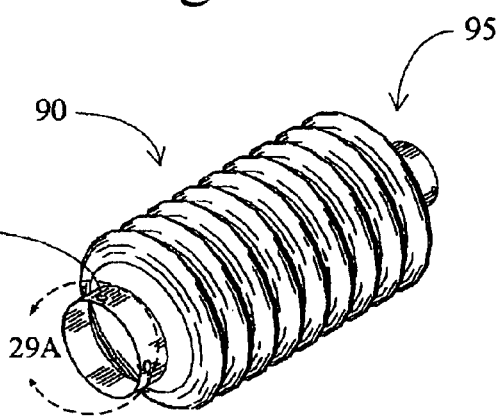
Fig. 29A　　　　　Fig. 29B

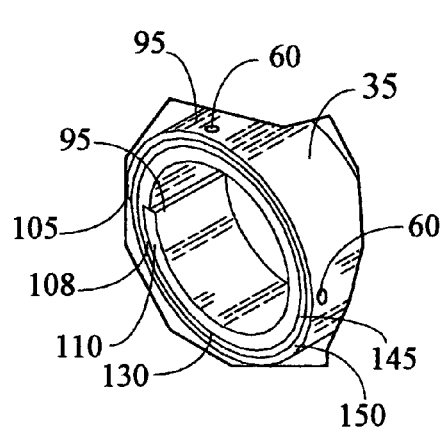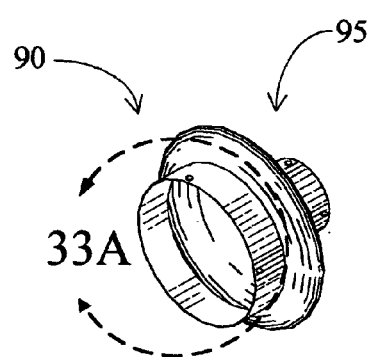
Fig. 33A
Fig. 33B

LAMINATED MULTIPLE-LAYERED SPLIT BOOT

BACKGROUND OF THE INVENTION

1. Field of Invention

This invention generally relates to a multiple layering means of dust protection split boot cover, specifically relates to a protective laminated multiple-layered split boot layer assembly system for a jointed coupling and device to-be-protected on axle (20). Its use is in applications such as a constant velocity joint, tie-rod, a guiding, controlling, steering, and push-pull piston-cylinder assembly. In other words, this present invention and method can be applied to any "threading through an axle" installation of protective dust covering split boot layer without the troublesome dismantling and consequent re-assembly of related parts and components, resulting in easy installation. The jointed coupling or device to-be-protected on axle (20) needs to be protected from harmful elements but good, helpful lubricants and grease need to be retained inside the present invention of protective laminated multiple-layered split boot layer assembly, easy installation achieved with a substantially high degree of reliability and integrity.

2. Prior Art

Usually non-split boots (as used in constant velocity joints, rack and pinion steering control bar or column, piston-cylinder assemblies, like hydraulic, air, pneumatic, etc) can be installed quite easily at initial machine assembly, since all parts and components are assembled together anyway. However, when such a non-split boot has a cut, a tear, a crack, a leak, or simply grown worn out, it may lose valuable grease or lubricant inside and allow external elements such as water, dust, dirt, or sand to enter causing faster deterioration and eventual destruction of the joint. In that case, replacement of the traditional non-split boot with yet another traditional non-split boot would require annoying disassembly-and-re-assembly of the joint and related components because of the need to thread the jointed coupling or device to-be-protected on axle (20) shaft through the boot. This disassembly and re-assembly requirement can mean very involved and labor-intensive tasks requiring many tough, grueling hours of labor, requiring a lot of patience and involving certain substantial risks as well, as will be discussed later.

Many automobiles today, like some rear-wheel drive and four-wheel drive as well as almost all front-wheel drive automobiles are equipped with constant velocity joints. Drive trains for front-wheel drive automobiles usually are made up of two half-shafts. Half-shafts comprise of an axle connected together by the use of constant velocity joints. Each half-shaft typically contains two constant velocity joints. The constant velocity joint nearest to the centerline of the automobile is commonly called the "inboard" joint, while the constant velocity joint or generally a jointed coupling axle shaft closest to the wheel assembly is commonly referred to as the "outboard" joint. The constant velocity joints allow one axle's rotating motion to be transferred to another axle, which eventually leads to the wheel rotation. Additionally, constant velocity joints allow the axles to accommodate the up and down motion of the joints. These joints have to be kept lubricated, and protected from dust, dirt, and debris by covering with a flexible cover or "boot".

Many methods, means, inventions and contraptions have been thought out and many of them do achieve some goals of avoiding the need of dismantling, consequently re-assembly, even re-calibration of related parts and components. However, they miss out or fail to address the other equally important, if not more important goal of achieving a certain acceptable level of substantial dust, dirt, and lubricant tightness. Due to this only partial achievement of the aforementioned main goals, many people has no choice but still has to continue buying the good old-fashioned and traditional non-split integral dust boot assembly replacement over solution products as split boot replacements currently on the market.

For example, Belzer in U.S. Pat. No. 4,813,913 shows a Protective boot assembly which describes a zipper and the use of a flexible sealant material in order to more effectively seal the zipper or similarly employed fastener mechanism.

Another one-piece split boot U.S. Pat. No. 4,676,513 by Tiegs, et al has screw type formed from a unitary, flexible body shaped to be helically wrapped around a universal joint forming a generally hollow truncated conical configuration with, as mentioned—a corrugated, helical shape.

U.S. Pat. No. 5,182,956 by Woodall, et al also had a protective boot split along a longitudinal seam closed by a zipper, a hook and loop type fastening strip, or other suitable attachment devices.

Also, Ron O. Biekx in U.S. Pat. No. 6,139,027 describes a CV (constant velocity) joint boot with sealing sleeves being longitudinally split boot with somewhat elaborate system of multiple parts and components making it tighter around protected part and is quite different from my invention.

Still other current art devices are U.S. Pat. No. 5,845,911 of Gimino and U.S. Pat. No. 5,222,746 of Van Steenbrugge from Belgium, with U.S. Pat. No. 5,845,911 using a replacement split boot assembly with elaborate arrangement of holes and rivets to hold the assembly together during operation. While U.S. Pat. No. 5,222,746 of Van Steenbrugge uses boot bellow halves made from a flexible material, comprising jointing snap-lockable closure means. Such closure means of lateral U-shaped interlock housing with a seam having a interlocking tongue on one side of the seam and a U-shaped groove on the other, fastened together by adhesive.

However, as stated before, all these devices and inventions do not really solve the issues associated with a protective split boot. With the protective boot split (to avoid threading in the axle), the split boot can open up to enclose around the jointed coupling or device to-be-protected on axle (20). It can also open up for all kind of adverse environments and foreign elements like dust, dirt, water, abrasives and sand, etc. Thus the seemingly elusive solution lies in effectively sealing out the bad harmful contaminants from entering the split boot and yet still prevent lubricant from leaving the area where it is supposed to stay to protect and lubricate.

Additionally, many of these prior arts, may even suffer from a major functional flaw in that, at times split boot can split open up prematurely, unpredictably, or even worse still intermittently, adding an element of surprise. Leaving us with a false sense of security of its proper functioning while it occasionally splits open during operation. This allows in and accumulate a lot of harmful dirt, sand grains, debris inside the split boot, and the part-to-be-protected (20) is constantly worn out by those harmful debris, abrasives, sand and dirt, etc. Imagine when it happens during crucial demanding high-speed freeway operation. Once again, all these risk possibilities are what make current solution products poor substitutes for the good old, regular traditional, non-split boot.

A jointed coupling or device to-be-protected on axle (20) or drive as in a constant velocity joint or a tie rod joint needs a boot assembly that can withstand continuous twisting, turning movement. Similarly, a protective piston-cylinder boot or a rack and pinion push-pull rod assembly must have sufficient strength to withstand numerous compressions and extensions of the actuating column rod. That is the reason why simple as it may look, in actuality getting these boot assemblies to perform on the same performance level as the good old, traditional, integral, non-split boot is no easy task. The need to improve is there and many solution products make it to the market, yet none is really quite successful.

All prior inventions and patents mentioned, taken either singularly or in combination, concerning protective split boots, are not seen to describe the present invention as claimed, do not completely solve the aforementioned problems and can be called quite unacceptable. Thus an effective and viable solution solving the aforementioned problems is definitely needed and desired.

3. Objects and Advantages

Accordingly, several objects and advantages of the present invention are as follows:

Several Objects

1. The present invention provides a quick and easy installation of protective split boot layer without the usual tough and often messy job of dismantling and re-assembling back together a substantial portion of related parts and components. These are accomplished without compromising on the overall split boot performance and integrity, offering substantially the same quality level as the old-style, regular, integral, or whatever one wants to call the traditional non-split boot.

For example, in the case of the jointed coupling or device to-be-protected on axle (20) in a typical automobile protective boot replacement of CV (constant velocity) joint, the rack-and-pinion unit, and tie-rod joint unit, substantial dismantling of wheel, control arms, etc. is a must. Later, followed up by the equally tough if not tougher job of re-assembly them back together, plus possible re-calibrations and readjustments. All these dismantling and re-assembly are done with the hope of not upsetting the then recent correct working settings, or status quo before the boot replacement. With my laminated multiple layered split boot assembly system, not only that the troublesome mandatory disassembly and re-assembly procedures are eliminated, thus allowing for quick and easy installation. Its one major advantage of substantially higher level of protective split boot integrity and sealing protection of vital part is also finally attainable and achieved.

2. The problems that come with the so very unnecessary and senseless disassembly followed by re-assembly of related parts and components as stated above, can be quite many. Such as misplacement or even loss of parts, incorrect disassembly and wrongful re-assembly, bad re-calibrations or re-adjustments (if calibrations or adjustments are ever needed, as in some cases).

Think of all the hassles and possible disastrous damage, frustrations and spent time and effort. Worse still, if some kind of strong brute force is somehow applied, say in disassembly-assembly, leading to damage or even severe permanent damage requiring further repair or replacement of other additional parts and components and re-calibration or re-alignment (such as wheel alignment) which as everyone knows, can be very expensive. These are the visible, discernible and known damage we can see and hear, what about invisible, hidden, serious, careless damage such as not properly tightened bolts and nuts, hidden damaged screw thread that can lead to serious accidents with possible loss of limbs and life. As the saying goes, "If it ain't broken, do not do anything about it!" In our case, unnecessary dismantling is unwise and should be cut down or avoided at all cost if possible and this is where the present invention can help avoid all these other unacceptable side effects and should I say, serious collateral damages.

3. To provide a truly acceptable level of reliability with protective split boot dust sealing integrity, in term of preventing harmful elements from getting inside the moving parts as well as retaining the good stuff like grease and lubricants from leaving, so it can do its good job of lubricating.

As it is common knowledge, what lack of grease or lubricant can mean, it is the dreaded, damaging metal to metal contact. So this present invention is meant not just to achieve rapid boot installation especially rapid boot replacement, avoidance of redundant disassembly and re-assembly procedure. It also attempts to raise the current state of the art or of integrity and reliability in protective split boot assembly to an even higher level, especially in terms of sealability and durability, approximately on the same level as the good old, traditional non-split boot. Basically the prior arts do not use multiple layering means of multiple split boot layer sealing like this present invention does. It is out to achieve what others failed so far.

Advantages

1) The present invention can make the installation much easier than the regular, good old, traditional non-split boot installation. It accomplishes this by splitting a boot layer in at least three ways of cutting, categorized by type 'A', 'B' and 'C' cuts, as will be further described later. It should be quite obvious that the possible number of cutting ways will not be limited to just three. When needed, more than 3 ways is still always possible, for example—random and arbitrary cuts can provide many additional ways. In other words, the three ways (namely, 'A', 'B' and 'C') of cutting are shown only as three of many possible examples here and discussed later in split boot layer cut type reference table. It is a revolutionary solution to some problems associated with many kinds of split boots, and is different from other products currently on the market, providing better advantages as can be seen further below.

2) The present invention utilizes not just one but at least two split boot layers, in other words, multiple split boot layers assembly providing better, advantageous sealing capability so far unavailable with virtually all products currently on the market.

3) It uses glue, sealant adhesive to laminate and reinforce the split boot layers assembly integrity. The material used in my present invention of split boot layer then has to be compatible and receptive of sealant glue or else has to be coated with primer glue coating.

4) Some other products may also use sealant glue adhesive, however one marked difference in this respect, is with other split boots, glue is applied only to very limited small glue coverage surface area and thus making only weak bonding. The present invention is different, the sealant glue adhesive application coverage area involved is substantially the entire or at least very large mating surface area of each abutting split boot layer (or even involving both abutting split boot layers). Because entire mating abutting surface area are coated with glue sealant adhesive, it provides extremely strong bonding power between two whole abutting mating glued and laminated surface areas of split boot layers, not seen or available in other products. Depending on what other prior arts are compared, the present invention uses substantially several, maybe tens, or even hundreds if not thousands times more gluing surface area than some other products used in a similar condition, providing unquestionably superior bonding strength. Huge or larger gluing surface area translates into super strong and substantial increase in sealing bond. Please also note: dual glue sealant adhesive coatings (140) can make glue bond even stronger, maybe doubly stronger.

5) Additionally, with using the entire or halves of split boot layers, comes the advantage of using the whole or half of split boot layers like some kind of glue reservoir holding glue sealant, consequently much reduced chance of dripping, dropping glue leading to unnecessary, unsightly, contaminating, gluey mess. This also is unavailable with other products either. Additionally, this reservoir effect helps with glue application over the entire inside surface area (80) of the split boot layer.

6) With this multiple layered split boot layers assembly, clamping, darning, clasping, embracing, enclosing, wrapping around effect and clumping together effect of a formed shape is put to good use. It provides strong powerful and effective clamping of each upper-layer split boot layer upon the previous lower-layer (145) bring out a lot of added strength to firm up the final integrated, glued, laminated and sealed split boot layer's integrity.

7) There is also another unique important advantage with laminated multiple layered split boot layers assembly, the number of split boot layers can be increased as much as needed, limited only by the available physical space around the split boot layers assembly installation area. This is made all the more possible when all subsequent, successive, additional upper-layer split boot layers (except the very first split boot layer, which needs to be thicker) can be made substantially thin and skinny, so numerous multiple split boot layers can be layered upon each other. With the exception of aforementioned physical space limitation and the other possible limit of whether there is really the need for that many split boot layers, there actually is no set limit as to how many split boot layers can be assembled this way. Needless to say, more layers means thicker, stronger and thus more overall split boot's sealing performance and durability.

8) The present invention thus makes possible not just the easy boot installation or replacement but also for split boot integrity and reliability (which is virtually non-existent before), thus finally offering a true substitute and alternative. Any protective boot device that needs to thread a jointed coupling or device to-be-protected on axle (20) through that boot can benefit from it. With this kind of boot integrity level achieved with my multiple layered laminated split boot system, it will be a real challenge and competition to the current dominant traditional non-split boot market share (especially in the area of replacement boot maintenance). It will immensely benefit the customers waiting for this kind of easy installation split boot performance and capability to finally show up on the market.

In other words, replacement of boot assembly will then be a snap without compromising on the required substantially high level of performance, rivaling the regular, traditional non-split boot assembly.

9) The present invention is not just limited to flexible, soft or softer shell split boot layer (as in the examples of CV joint boot, rack-and-pinion column boot, and tie-rod). It is applicable to the substantially hard, or more rigid shell split boot layer, which can surely enjoy using my laminated and integrated multiple-layered protective split boot layer assembly system.

10) My present potential crowd-pleaser invention is set to please and benefit not only regular, off-the-street customers but also the professional mechanics.

a) It is set to empower the DIY's (do-it-yourselfers), weekend home mechanics warriors, rewarding them with good, easy, highly reliable, performance new or replacement split boot system that had failed and eluded them all these times.

b) another sure thing is with the easy installation comes with split boot sealability performance in the present invention of a multiple-layered laminated split boot layer assembly system (90), the joy and better installation job quality due to personal involvement will sure make a car owner installer very proud and save some money as well.

11) more variations are also possible with more split boot layers as seen fit in creating further different combinations and thus embodiments of laminated multiple-layered split boot layers, affording and empowering the user of multiple-layered laminated split boot layer assembly system (90), the flexibility of many different combinations and configurations for different application requirements.

12) A big bonus benefit is here. Now that with easy installation plus reliability finally available and within easy reach, there will be more prompt and more frequent split boot layers assembly replacements, which in turn, will lead with positive results to:

a) Safer roads and streets just mainly due to improved, easier, reliable and more frequent maintenance;

b) the present invention of laminated multiple layered split boot is set to truly help protect the main process of motion that drives most of the automobiles today, namely the constant velocity boots by way of c) less unnecessary mechanical breakdown;
   i) leading to longer life for expensive, resource-extensive equipments like automobiles, countless heavy equipments like bulldozers, earth movers, crane, trolleys, forklifts, etc.;
   ii) helping to conserve world and global resources, think about unnecessary, premature wear and tear leading to replacements of more expensive related, peripheral parts and components such as CV joint, axle, or entire rack and pinion column unit, tie-rod joint, or even the entire hardware equipments, etc., plus the accompanying labor cost;

d) eliminating the senseless disassembly and re-assembly process means:
   i) Less unnecessary misplaced or lost parts and components (during disassembly and re-assembly process);
   ii) Less status quo upsetting dismantling and its accompanying so very redundant re-calibration, re-adjustment or worse still damage due to undue brute force possibly used in the process ending with maybe expensive replacement;

Overall:

e) less regretful mishaps, events, frustrations, and better working, living environments for everyone;

f) Less unsightly, dirty-looking, or torn dust boots spreading grease contaminants wherever they go;

g) Helps provide and promote safer, quality working and living environments for all, when hardware are maintained properly through the use of my multiple layered split boot system;

h) Last but definitely not of the least importance, again it helps create much safer transportation for all.

Further objects and advantages will become apparent from a consideration of the ensuing descriptions and drawings.

SUMMARY

In accordance with the invention, integrated, sealant glue adhesive reinforced, laminated, multiple-layered, protective split boot layer system in the present invention set out to achieve two major goals. First off a quick easy installation without all the so very unnecessary, senseless, and redundant dismantling and its ensuing re-assembly jobs. Secondly, to provide good, reliable, satisfactory, protective shield means for the device to-be-protected on axle (20) and yet retain good elements like grease or lubricant. The result is a laminated, integrated, multiple layered, protective means using a laminated multiple-layered split boot layer assembly system (90), installed with properly positioned slit or split line where necessary for split boot layer system's sealing performance using sealant glue adhesive reinforcement.

BRIEF DESCRIPTION OF THE DRAWINGS

The very first split boot layer (5C, 5R, 5T) is of substantially same thickness or sturdiness as all the subsequent, successive split boot layers (10C, 10R, 10T), and (15C, 15R, 15T). That very first split boot layer (5C, 5R, 5T) can also be substantially thicker or sturdier than the subsequent, successive split boot layers (10C, 10R, 10T), and (15C, 15R, 15T). This sturdiness allows it to act as a firmer base foundation for the subsequent additional upper-layer split boot layers (10C, 10R, 10T), and (15C, 15R, 15T) that follow, to build upon with glue sealant bonding sandwiched in-between corresponding adjacent abutting split boot layers. The protective seal and strength is the result with durability, whereby forming a "multiple-layered" protective split boot layer assembly system.

Technically, each split boot layer can be formed by cutting angularly, helically, longitudinally or even randomly or simply arbitrarily cut in anyway as the need arises.

Figure 1A:
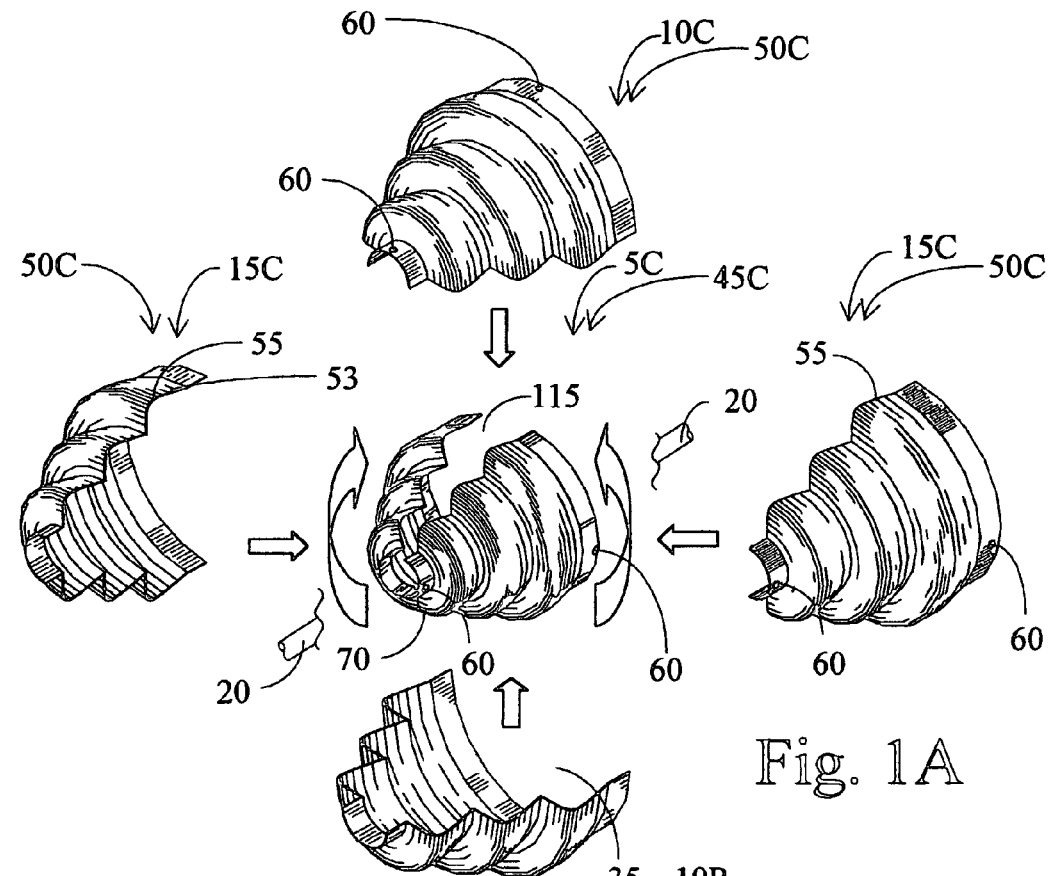

Split Boot Layer Cut Type Reference Table. Split boot layer can be categorized into the following three basic types depending on the way it is split or cut:

1. Regular or type 'A' cut (40C, 40R, 40T): this type cuts a boot layer axially to have one complete axial cut from one sealing sleeve (35) end to another sleeve (35) end, whereby forming a horizontal axial slit or one complete cut (55) split line.
2. Pivoted or type 'B' cut (45C, 45R, 45T): this cut type is same as the regular or type 'A' cut (40C, 40R, 40T) but additionally there is a second partial or incomplete axial cut at substantially diametrically opposite position right across the first complete cut (55). By incomplete cut, it means almost cut through the split boot layer but leaving the tiptop level of the crests (25), creating a pivot line of crests (65), thus earning its name pivoted or type 'B' cut. The two cuts, one complete cut (55) split line and another incomplete cut (70) split line will then be substantially right across each other.
3. Halved or type 'C' cut (50C, 50R, 50T): this cut type is similar to pivoted or type 'B' cut (45C, 45R, 45T) but the second cut is a complete axial cut splitting the split boot layer into two physically separate split boot layer halves (75) of substantially equal size.

Referring now to the figures by numerals of reference, FIG. 1A shows first embodiment (as in a constant velocity joint boot) split boot layer assembly, in an exploded view. The first split boot layer is of pivoted or type 'B' cut. The subsequent second and third split boot layers are both of halved or type 'C' cut.

Figure 1B:
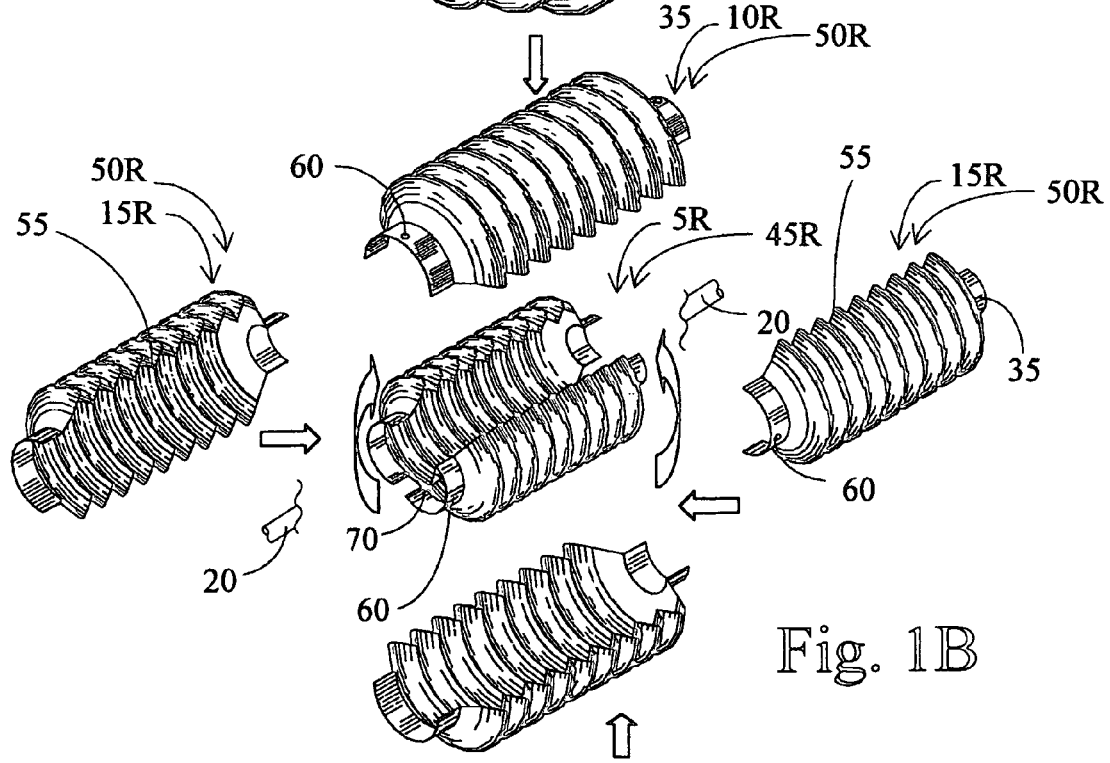

FIG. 1B shows first embodiment (as in a rack and pinion unit's boot) split boot layer assembly, in exploded view. The first split boot layer is of pivoted or type 'B' cut, while subsequent second and third split boot layers are both of halved or type 'C' cut.

Figure 1C:
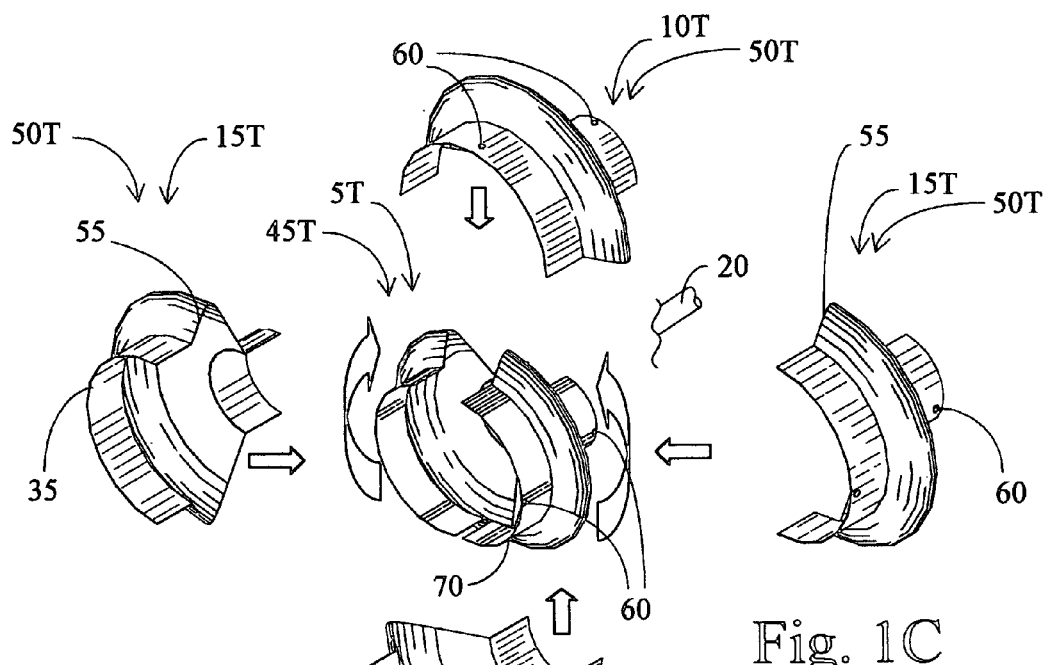

FIG. 1C shows first embodiment (as in a tie-rod boot) split boot layer assembly, in exploded view. The first split boot layer is of pivoted or type 'B' cut, while successive second and third split boot layers are both of halved or type 'C' cut.

Figure 2A:
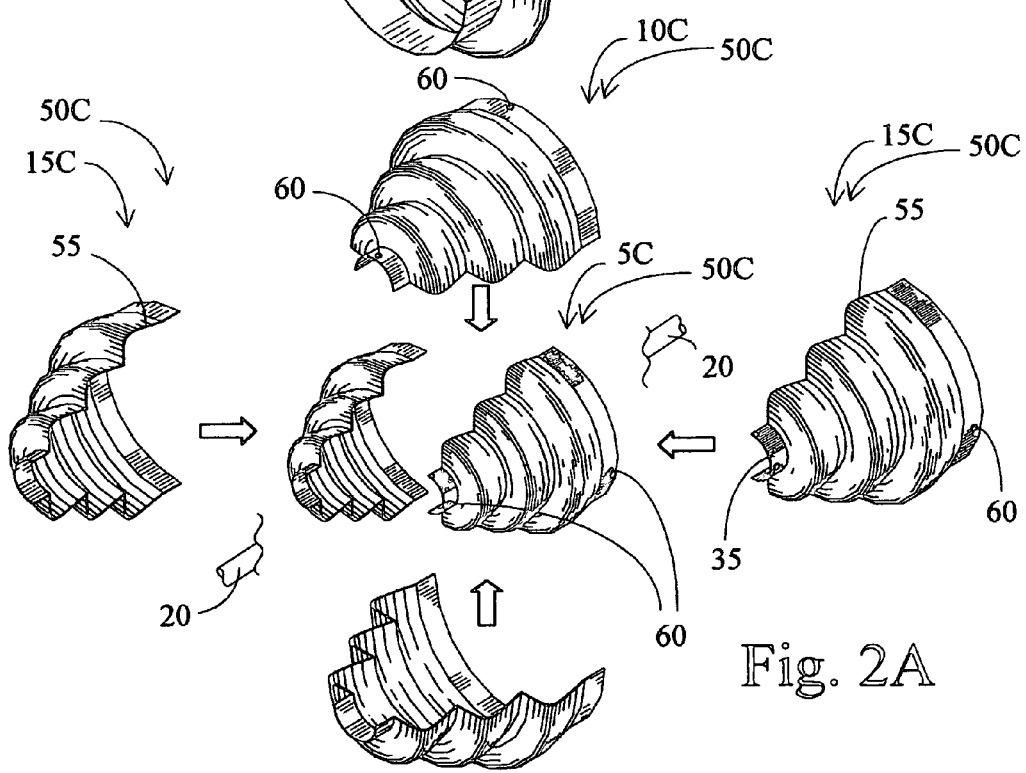

FIG. 2A shows second embodiment (as in a constant velocity joint boot) split boot layer assembly, in exploded view. The first, second and third split boot layers are all of halved or type 'C' cut.

Figure 2B:
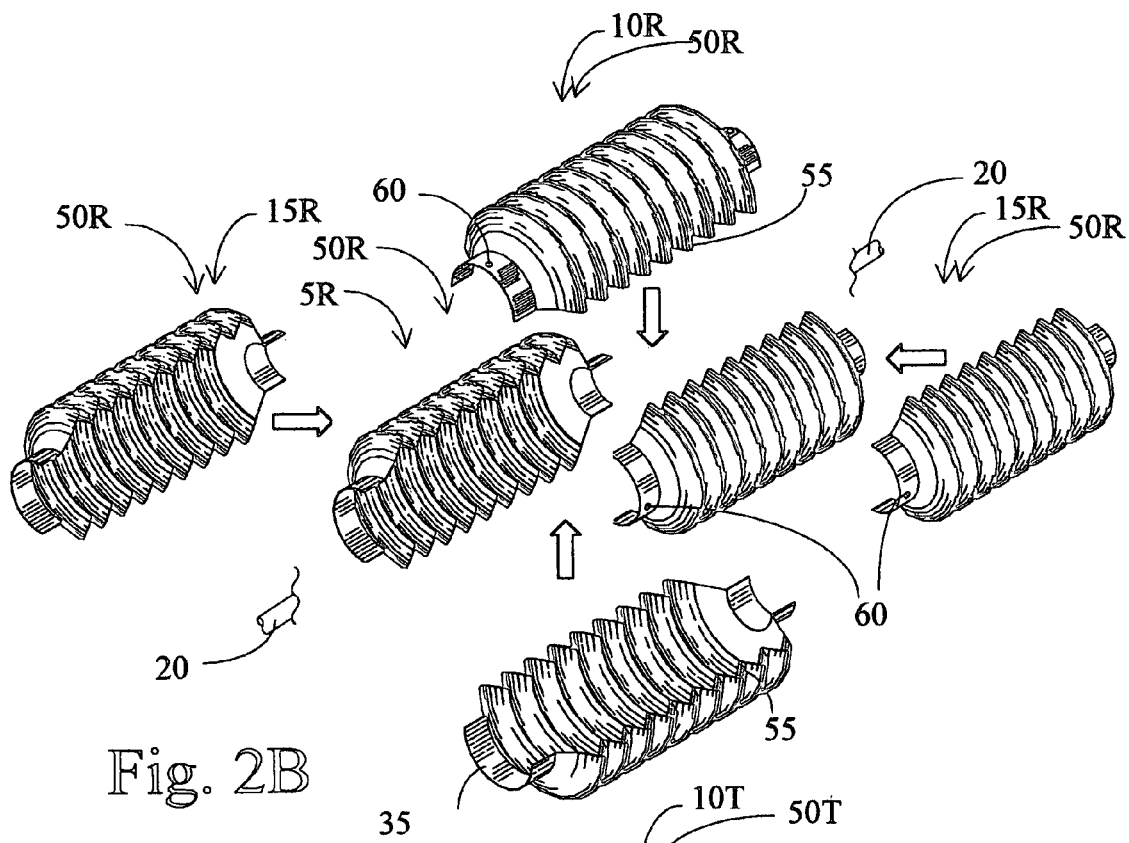

FIG. 2B shows second embodiment (as in a rack and pinion unit's boot) split boot layer assembly, in exploded view. The first, second and third split boot layers are all of halved or type 'C' cut.

Figure 2C:
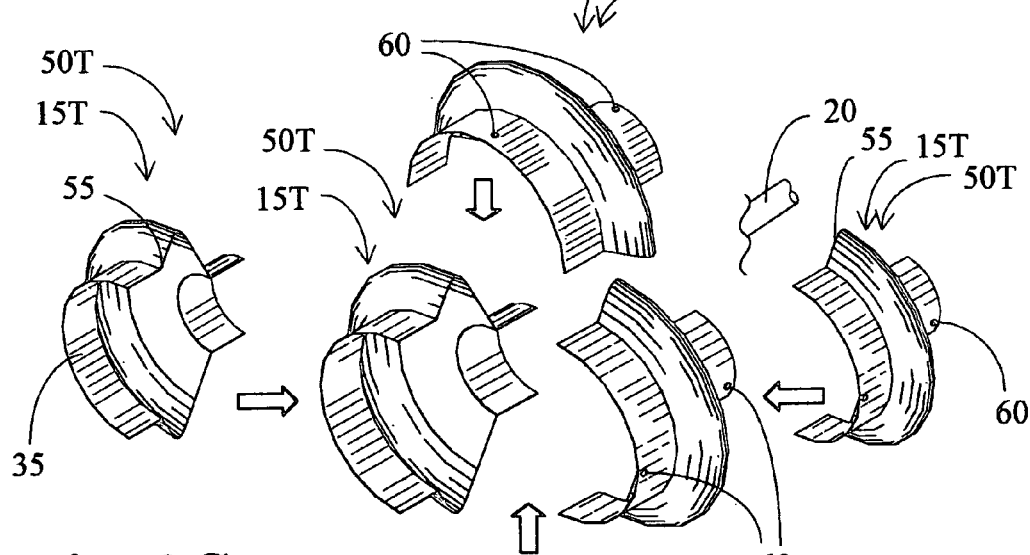
Figure 3A:
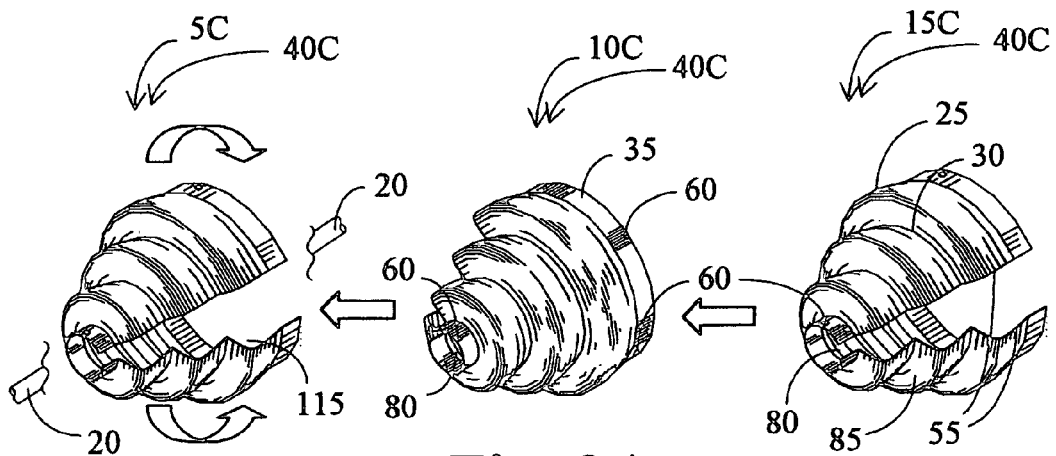
Figure 3B:
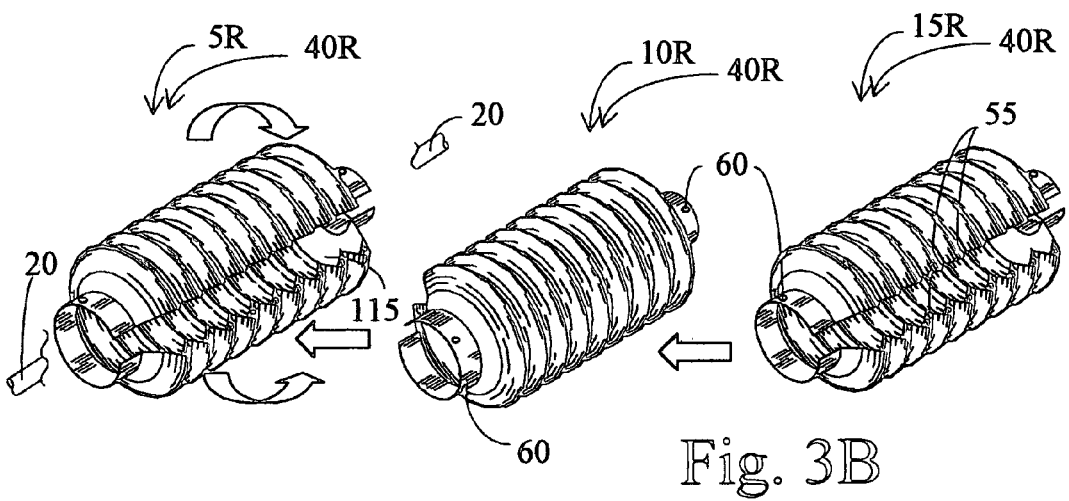
Figure 3C:
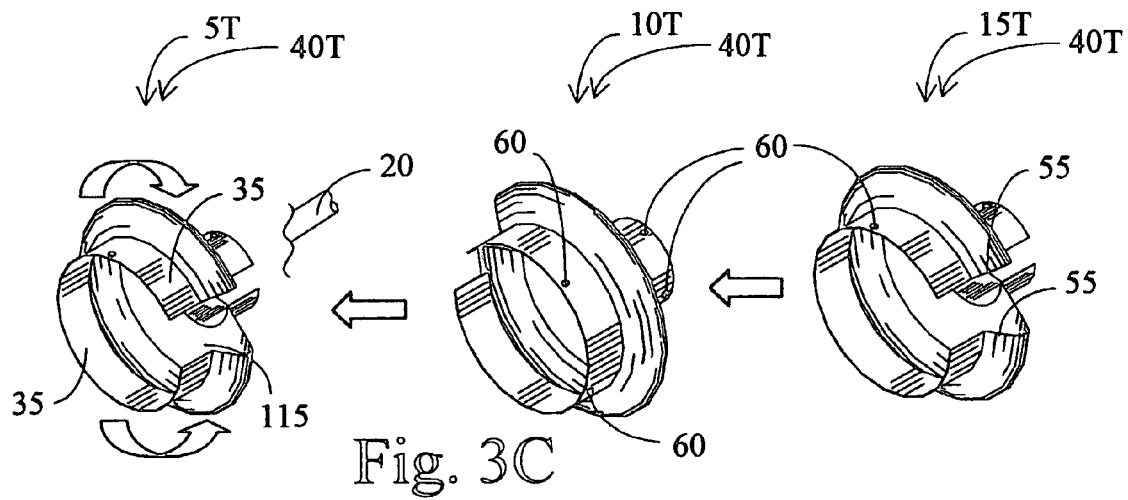
Figure 4A:
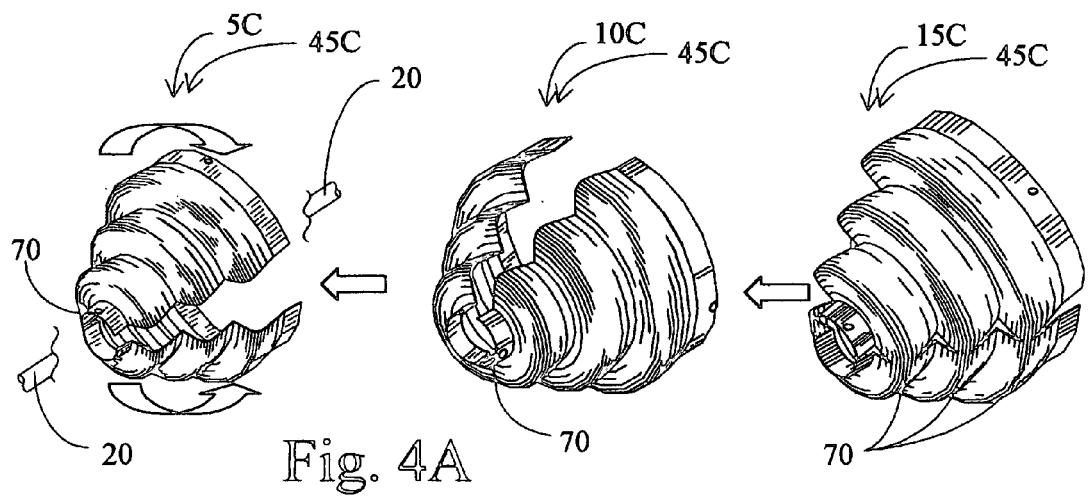
Figure 4B:
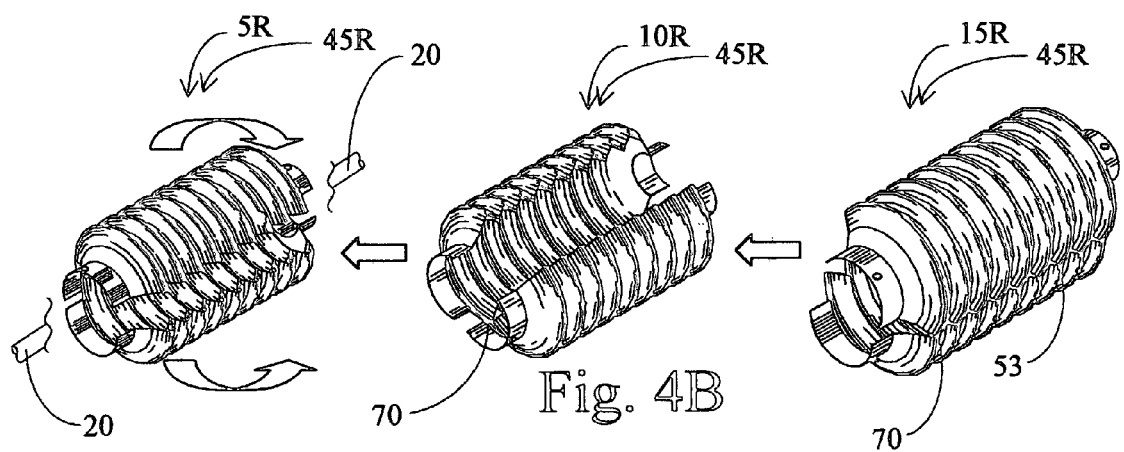
Figure 4C:
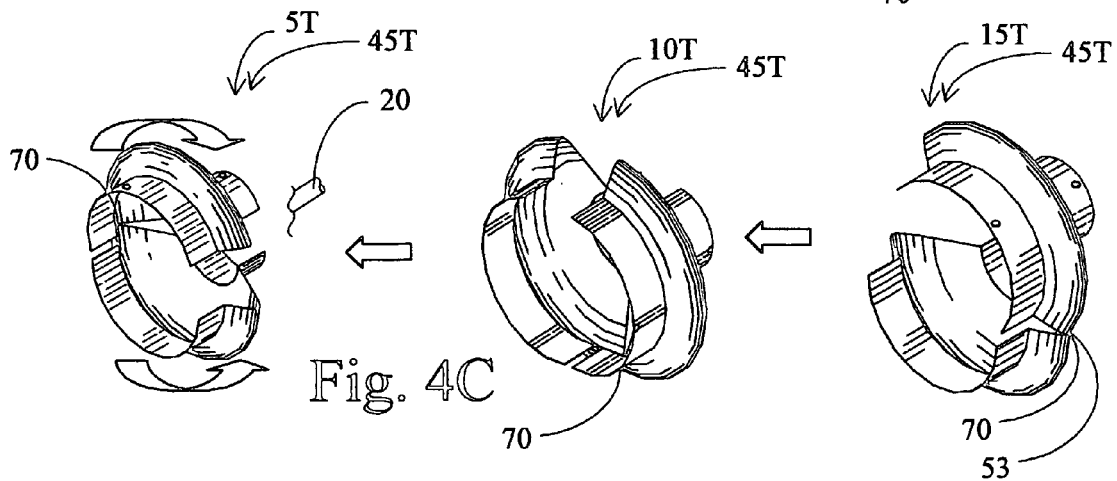
Figure 5A:
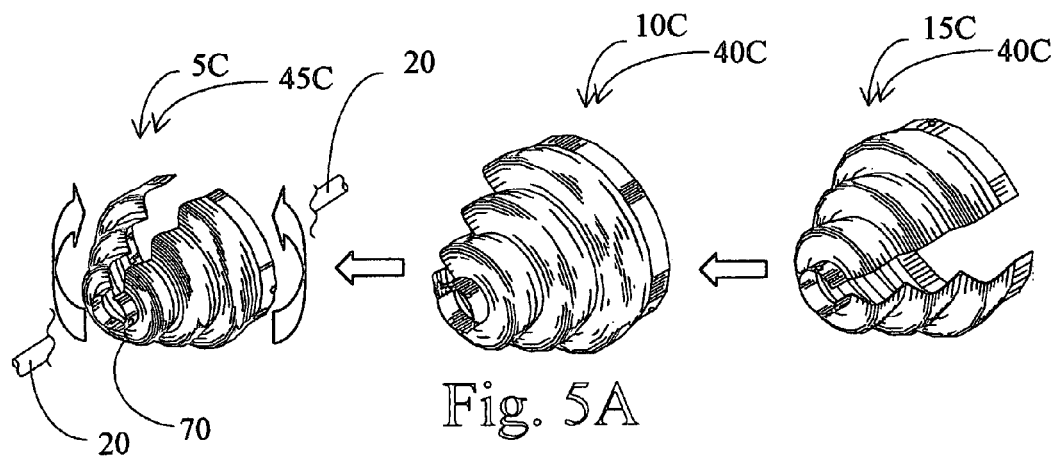
Figure 5B:
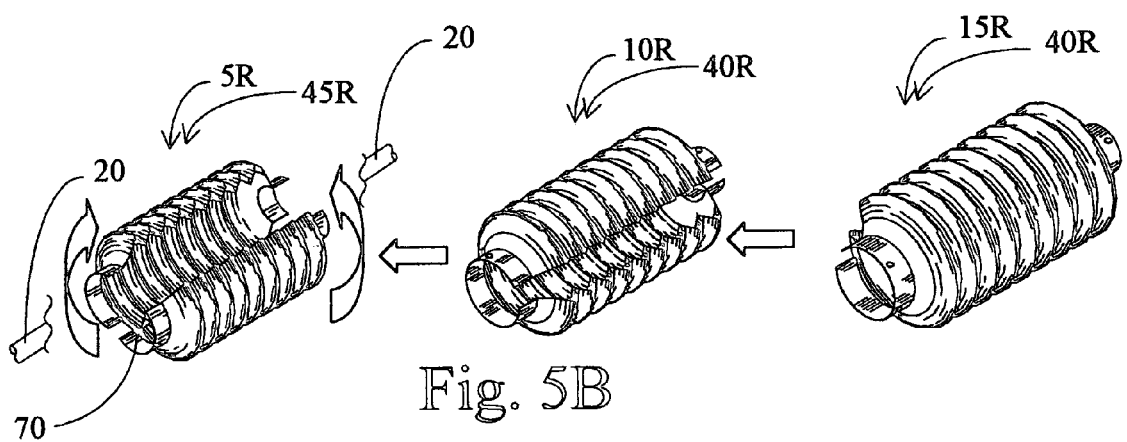
Figure 5C:
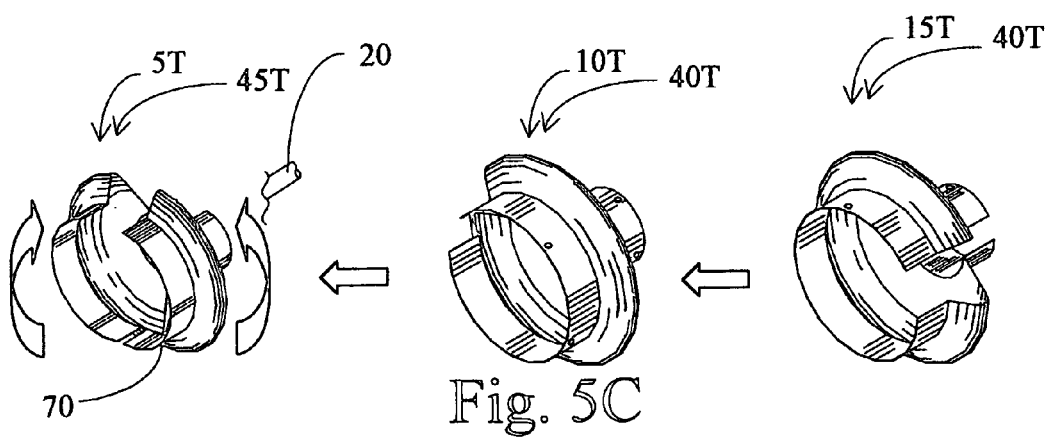
Figure 6A:
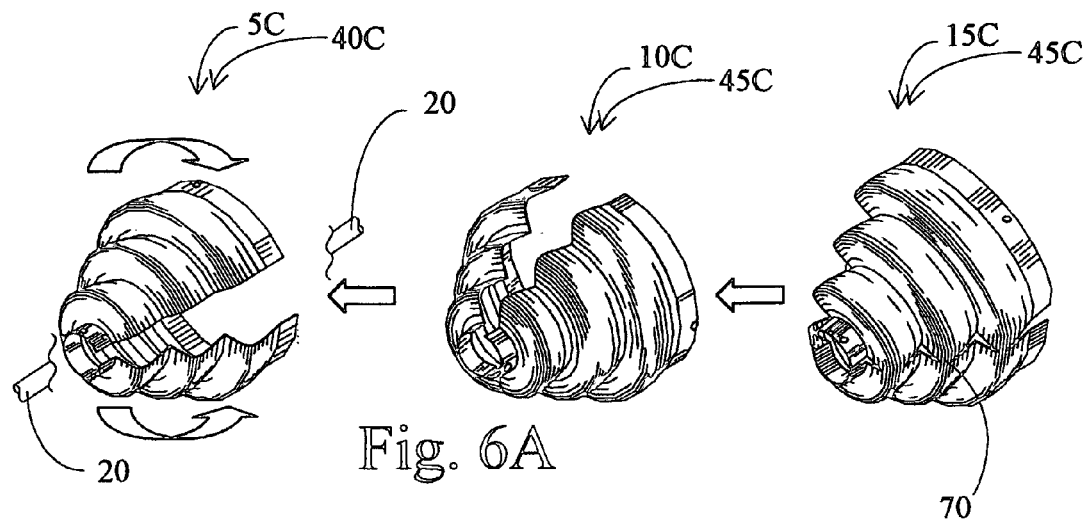
Figure 6B:
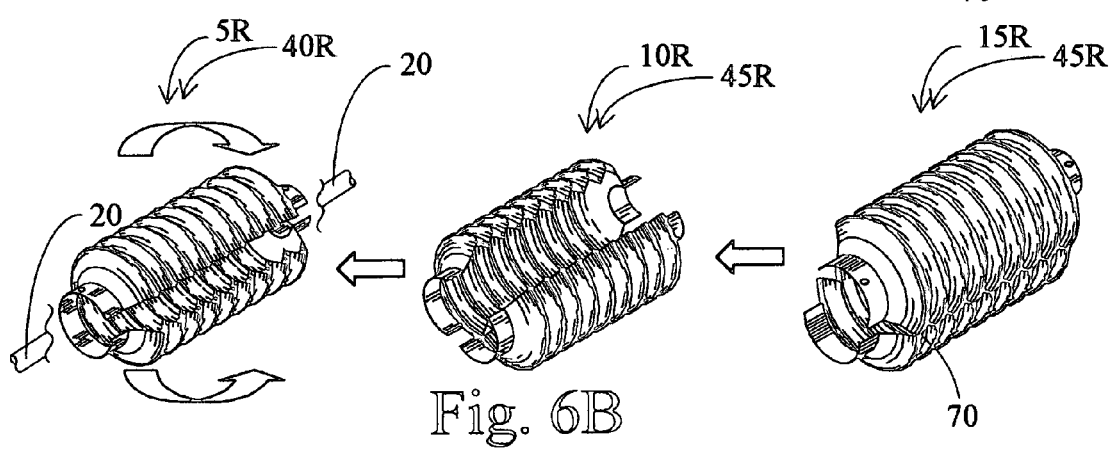
Figure 6C:
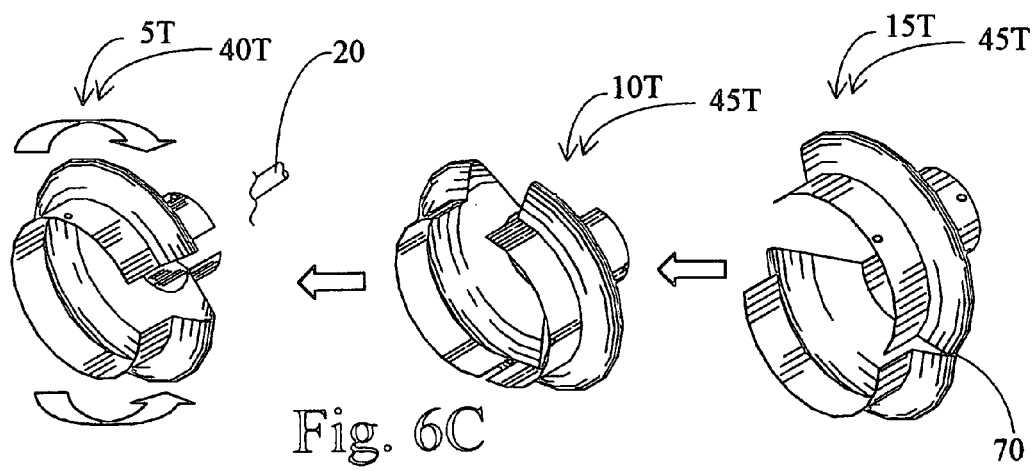
Figure 7A:
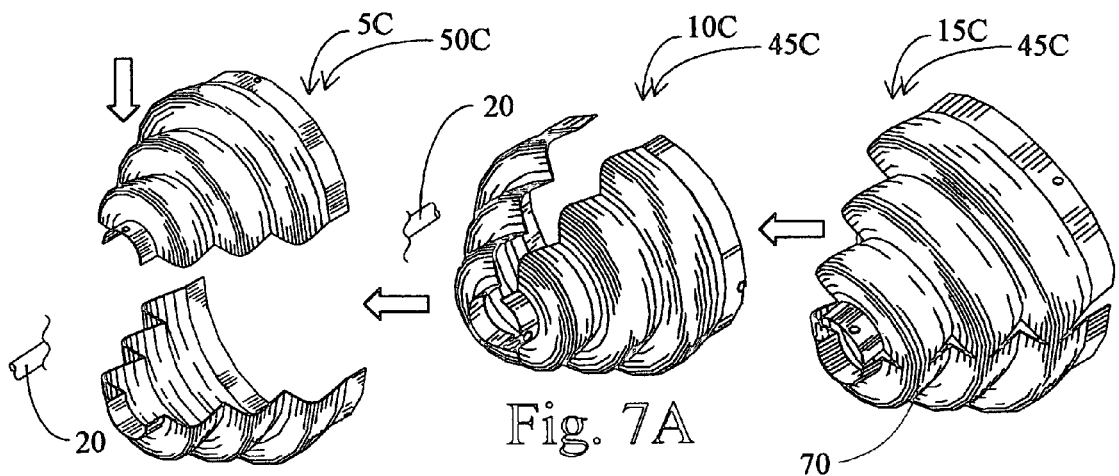
Figure 7B:
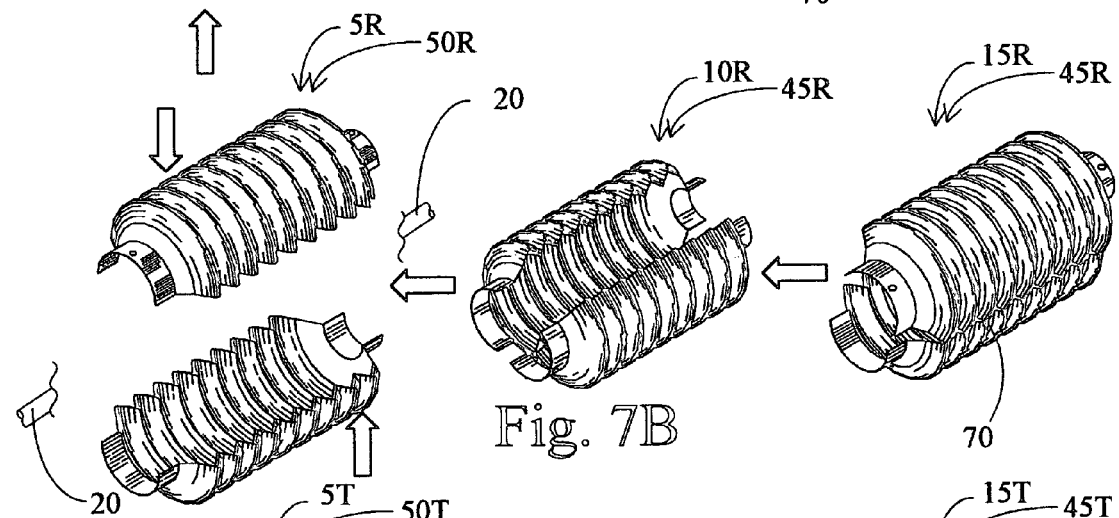
Figure 7C:
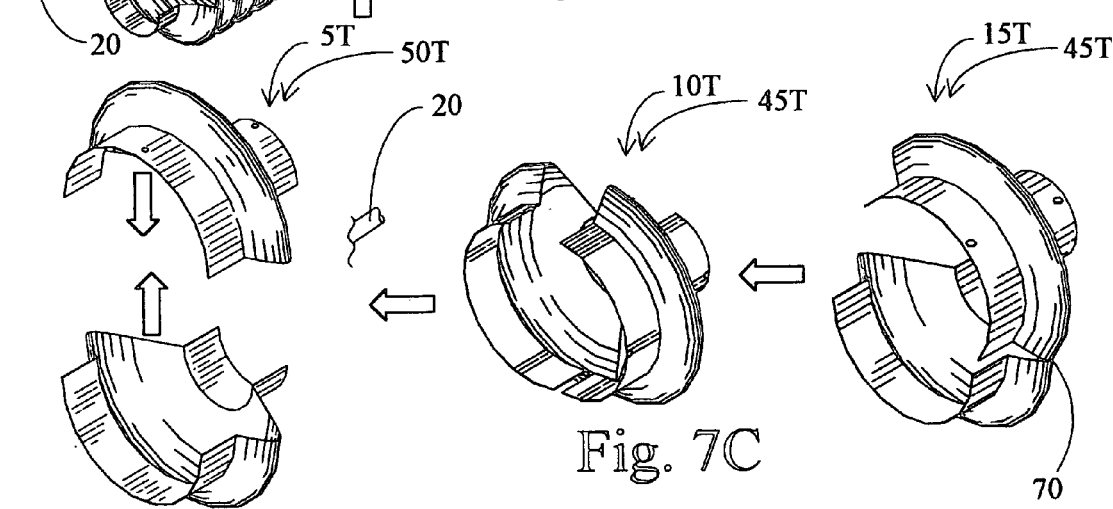
Figure 8A:
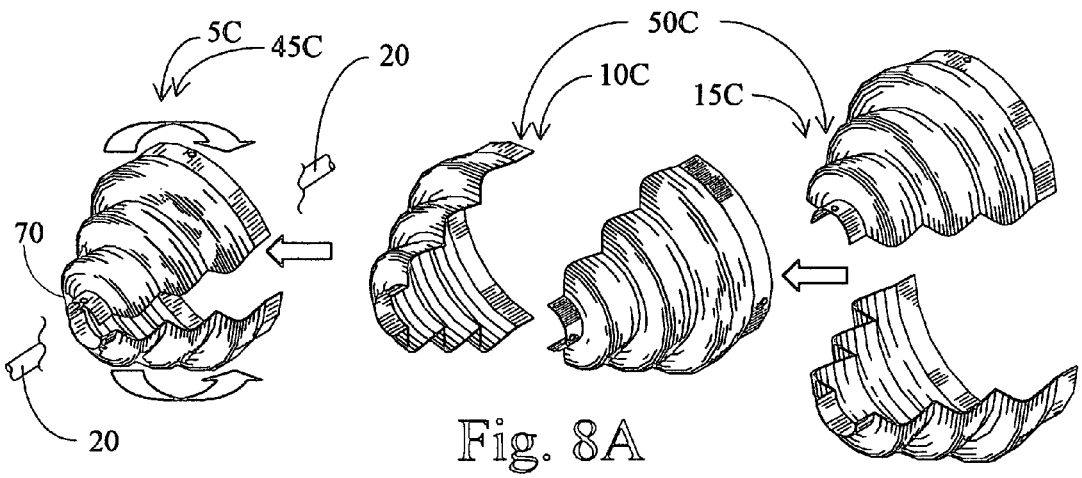
Figure 8B:
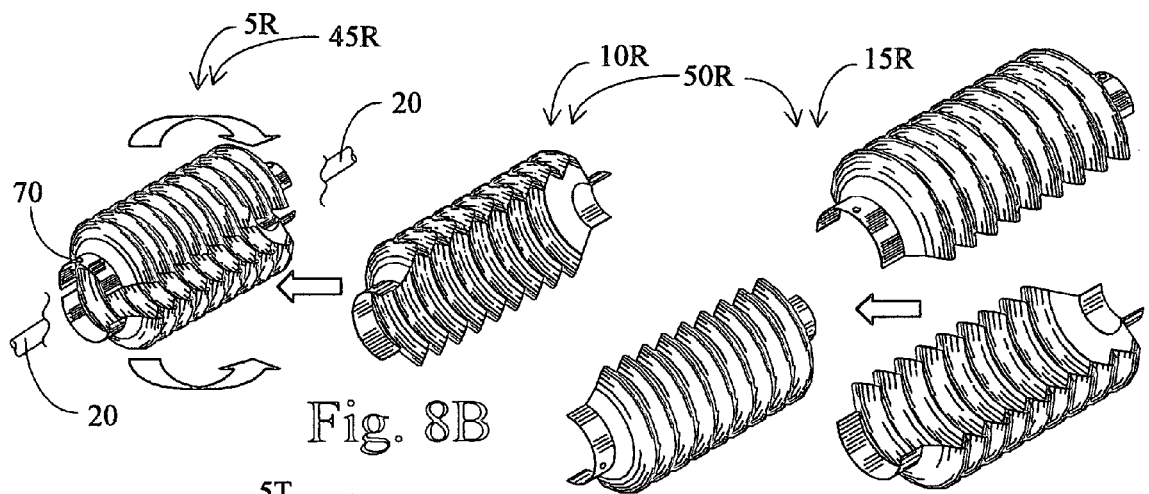
Figure 8C:
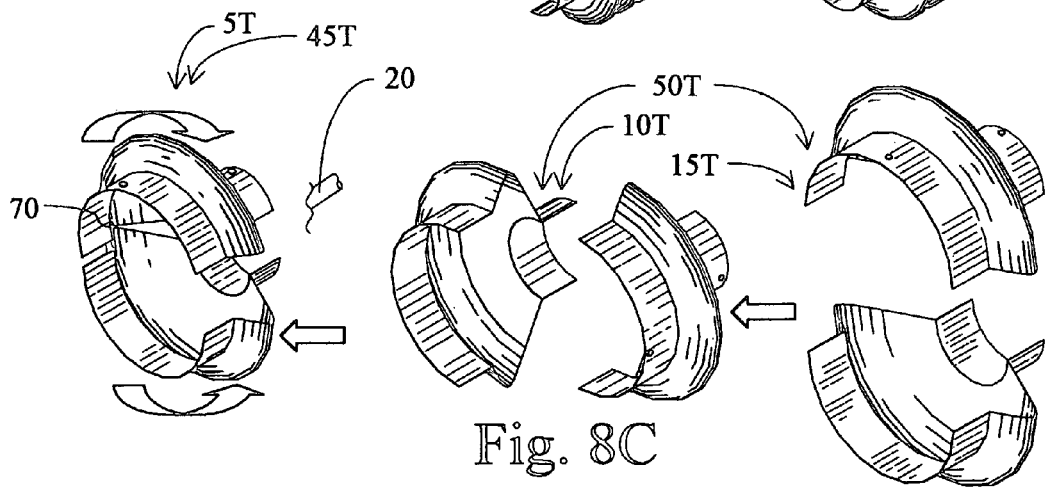
Figure 9A:
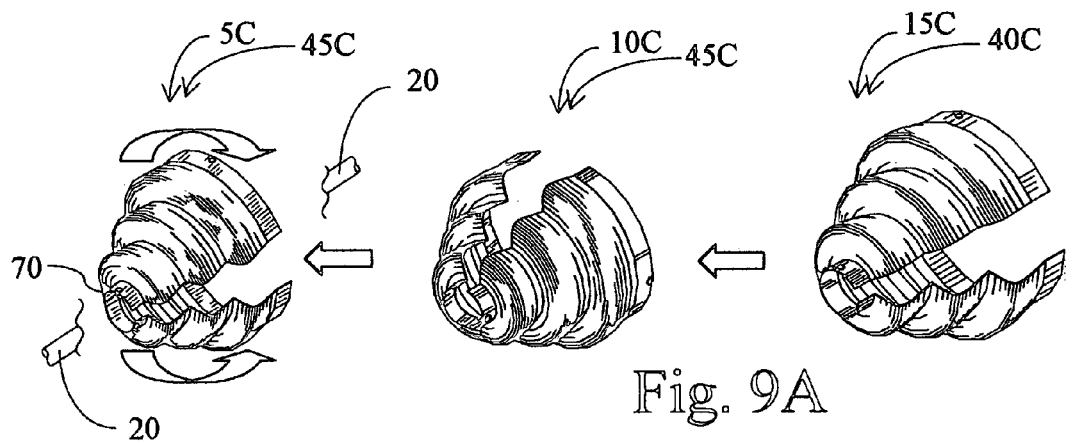
Figure 9B:
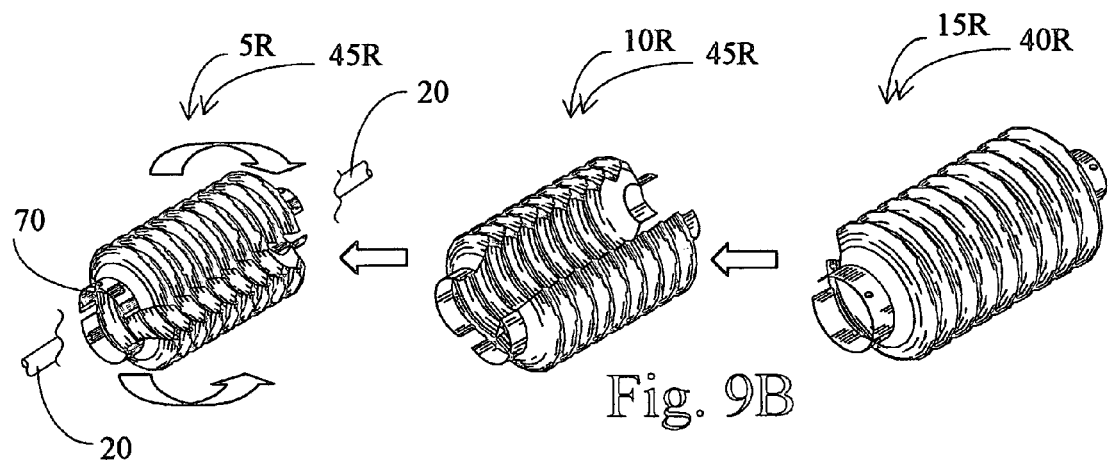
Figure 9C:
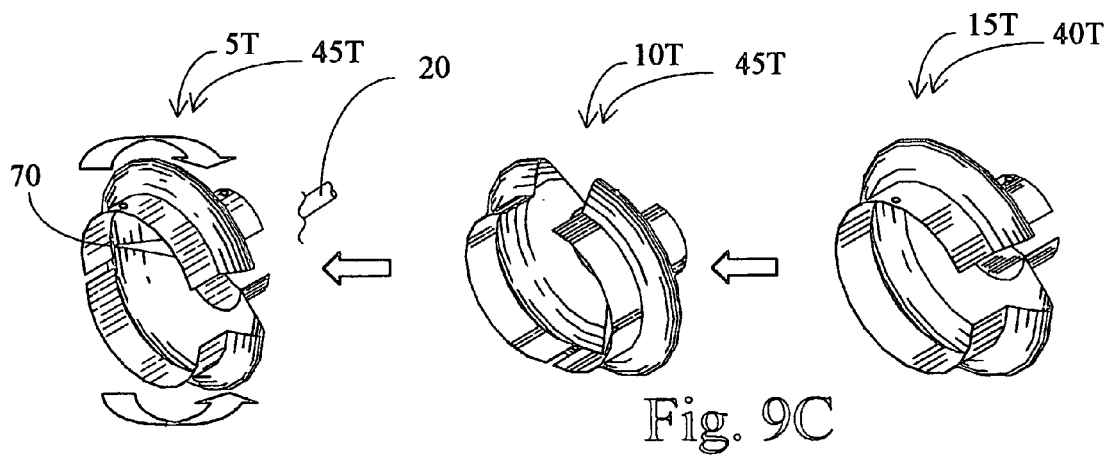
Figure 10A:
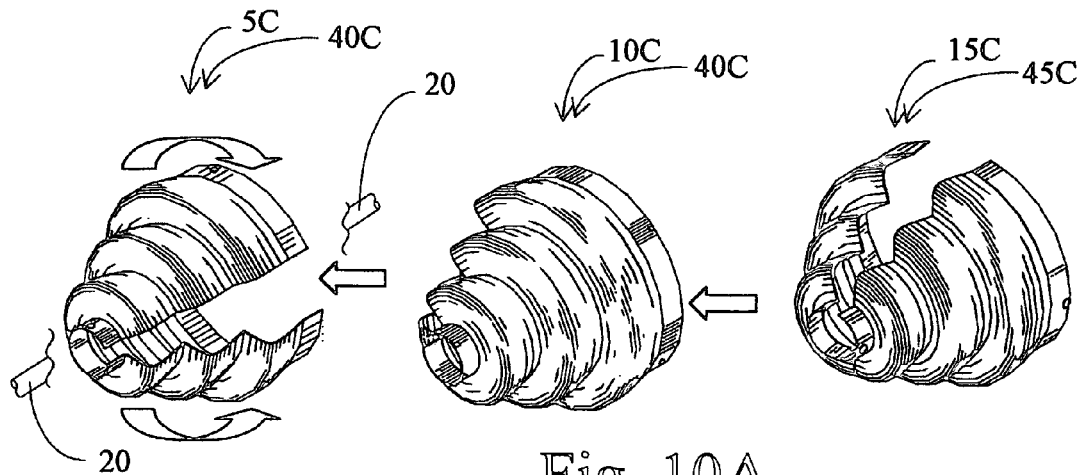
Figure 10B:
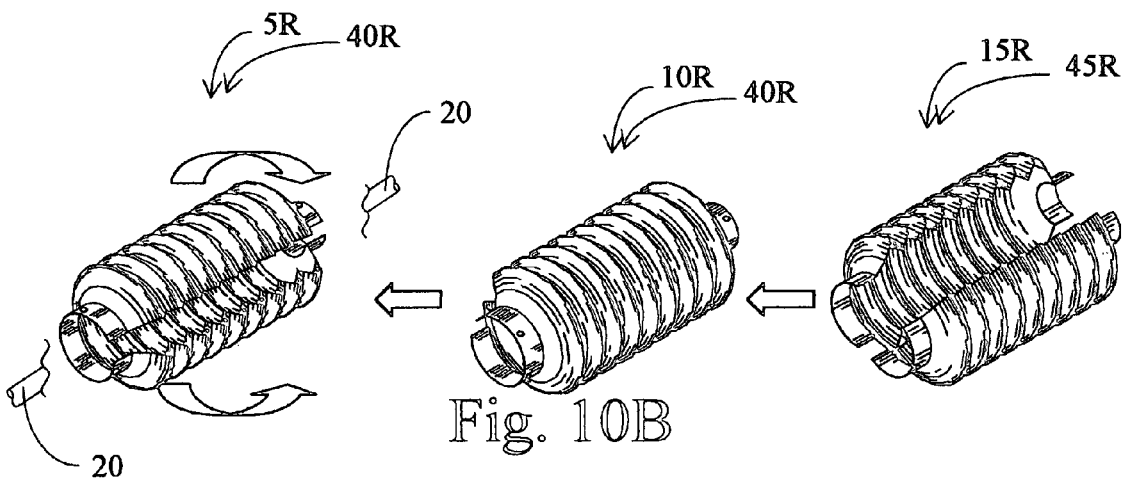
Figure 10C:
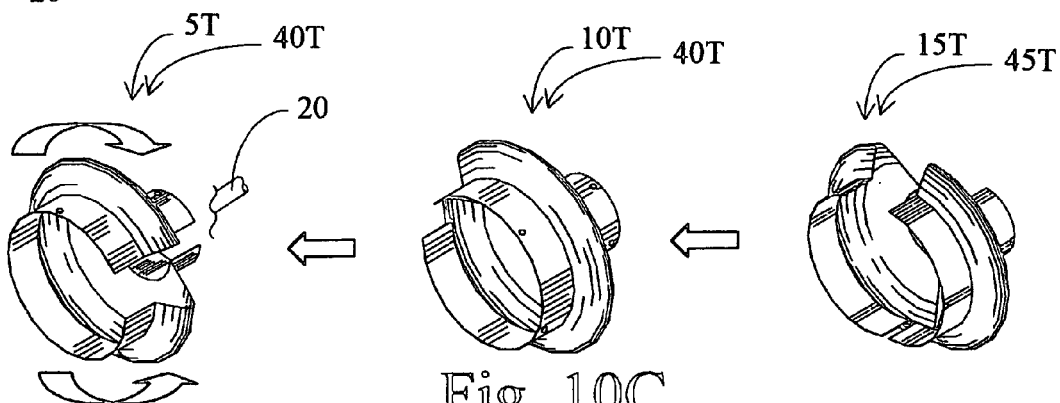
Figure 12A:
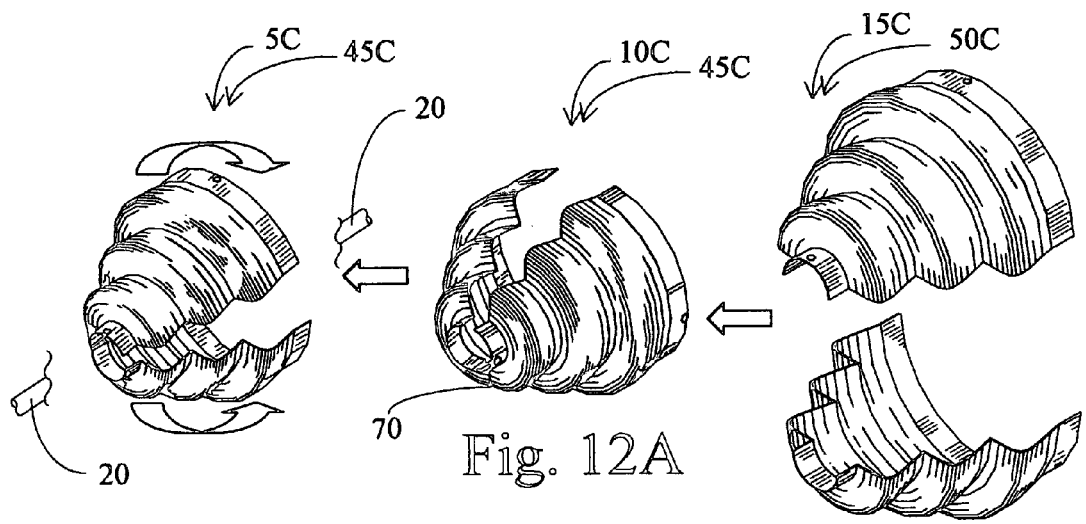
Figure 12B:
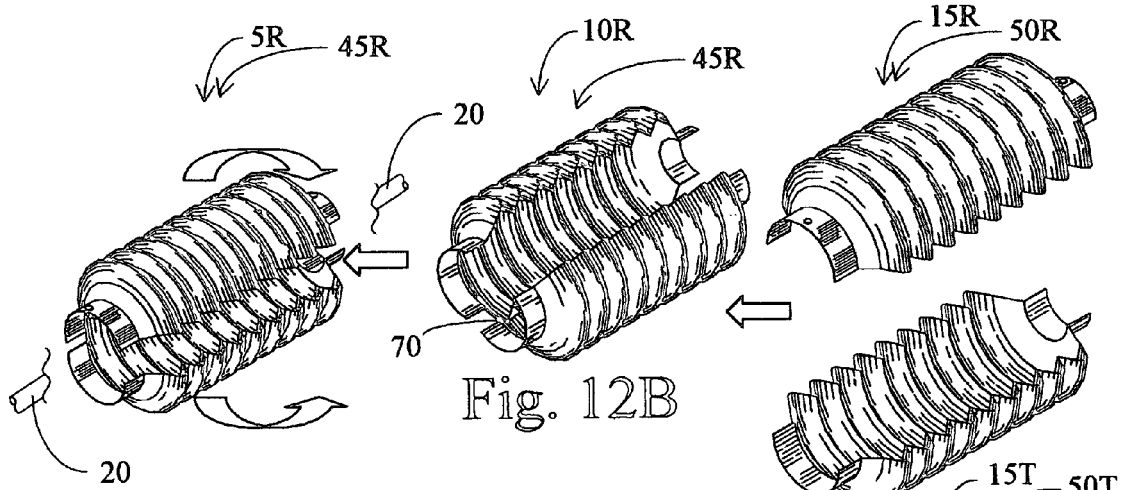
Figure 12C:
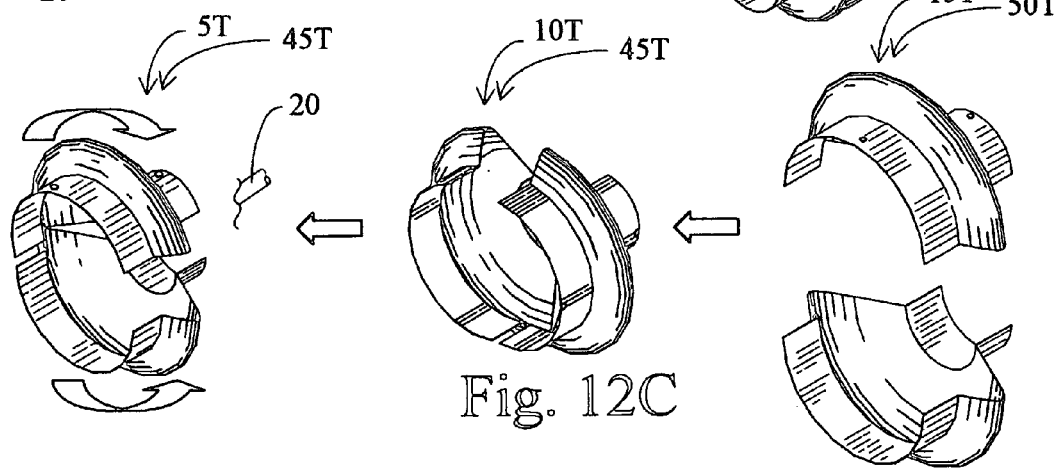
Figure 13A:
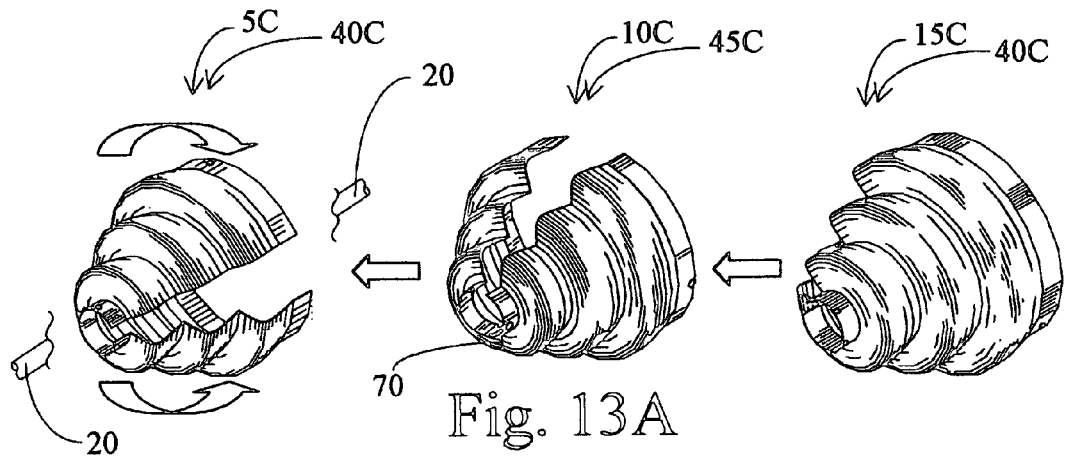
Figure 13B:
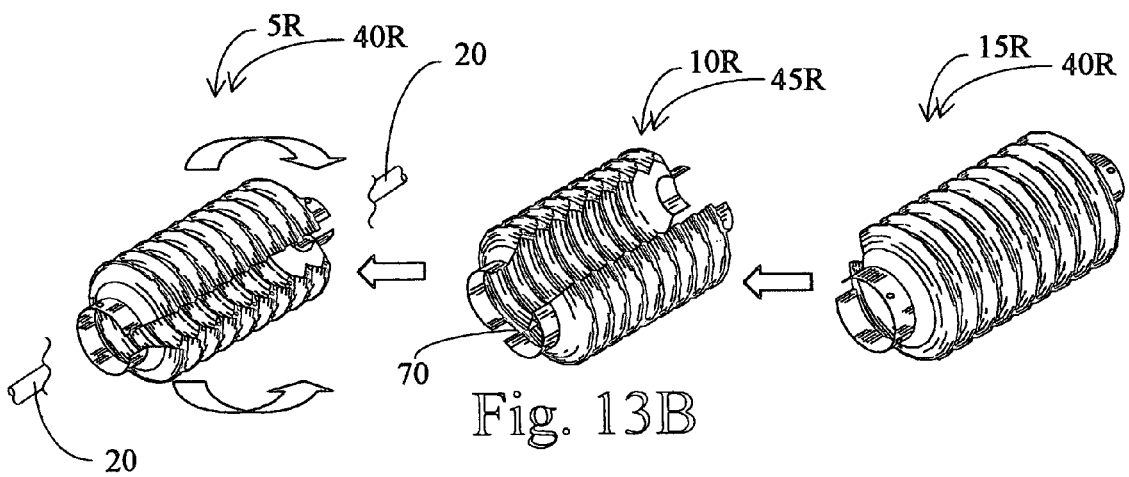
Figure 13C:
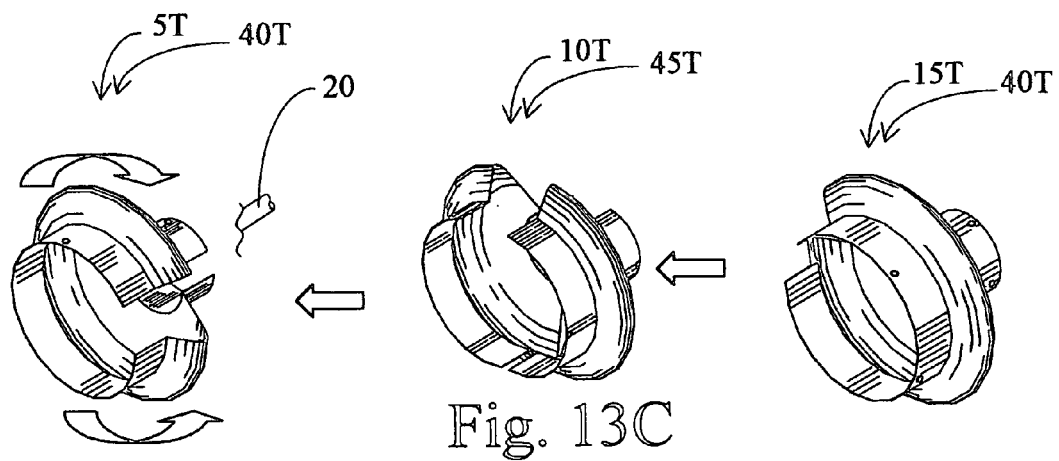
Figure 14A:
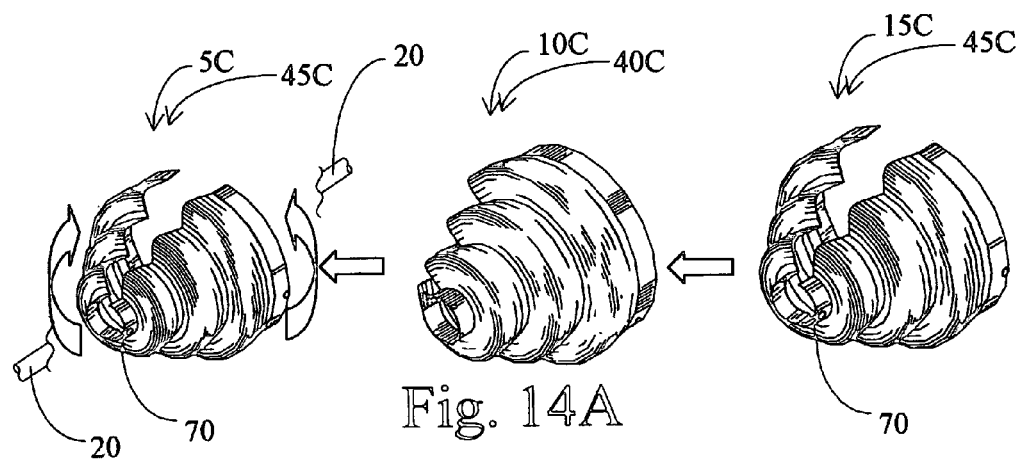
Figure 14B:
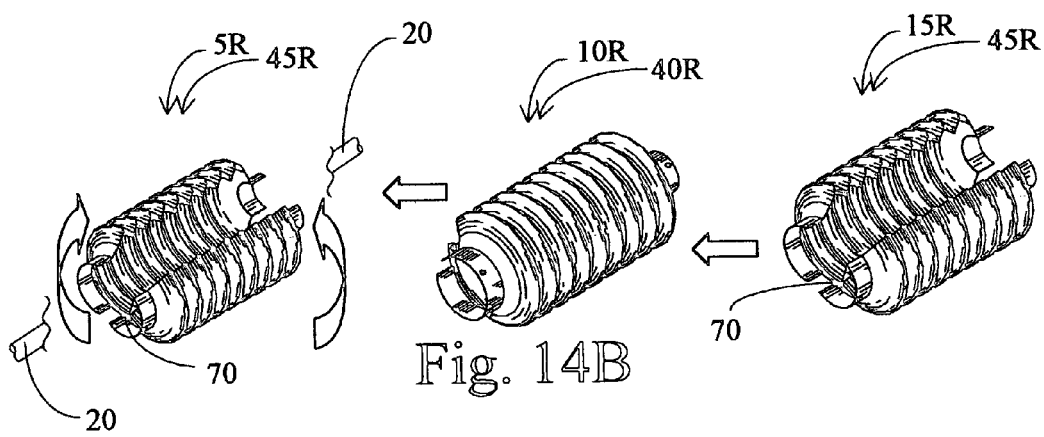
Figure 14C:
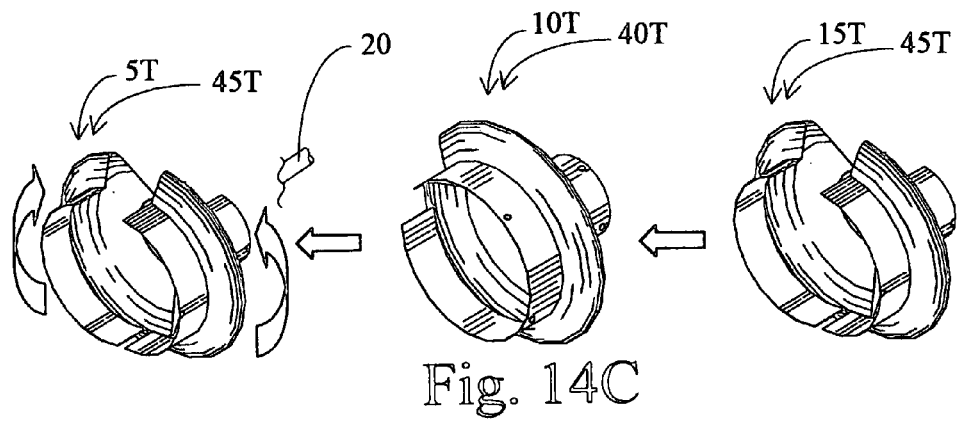
Figure 15A:
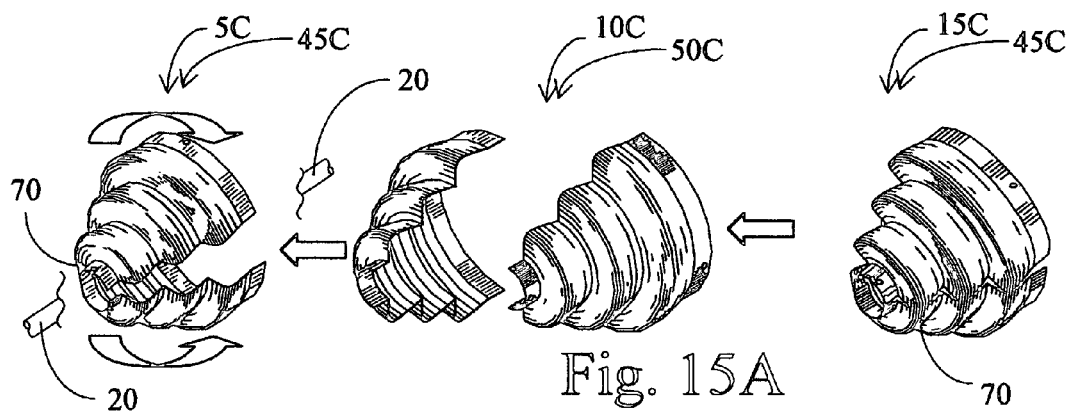
Figure 15B:
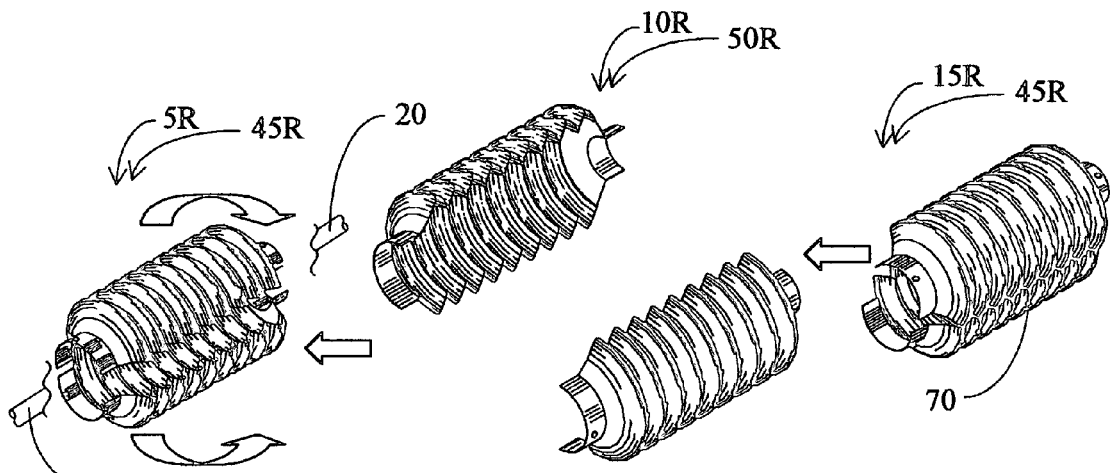
Figure 15C:
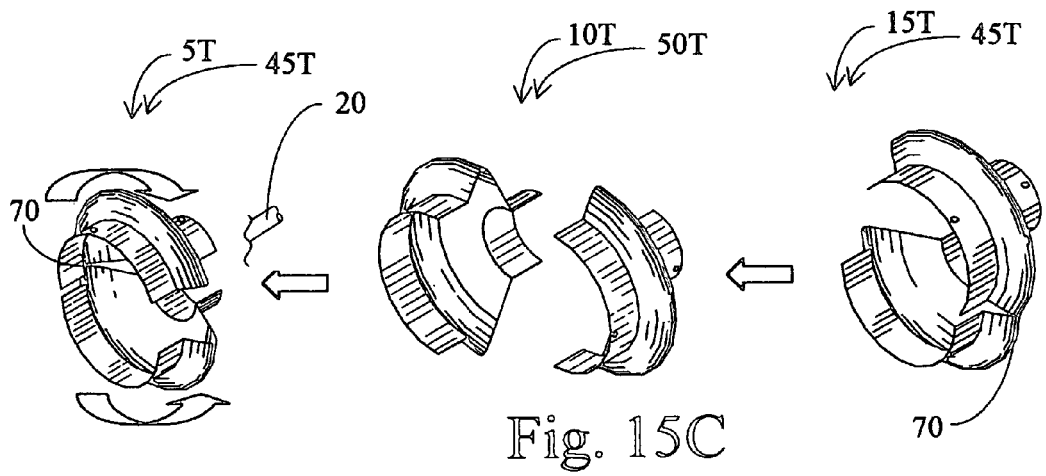
Figure 16A:
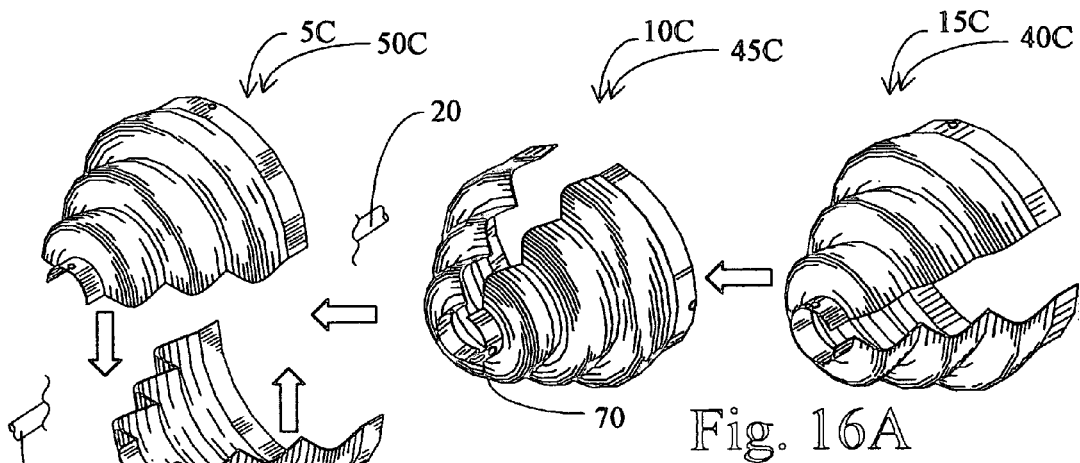
Figure 16B:
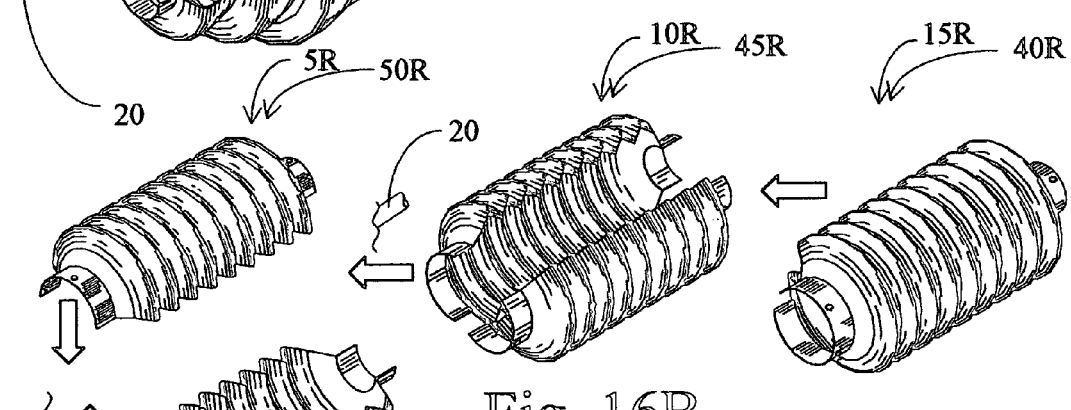
Figure 16C:
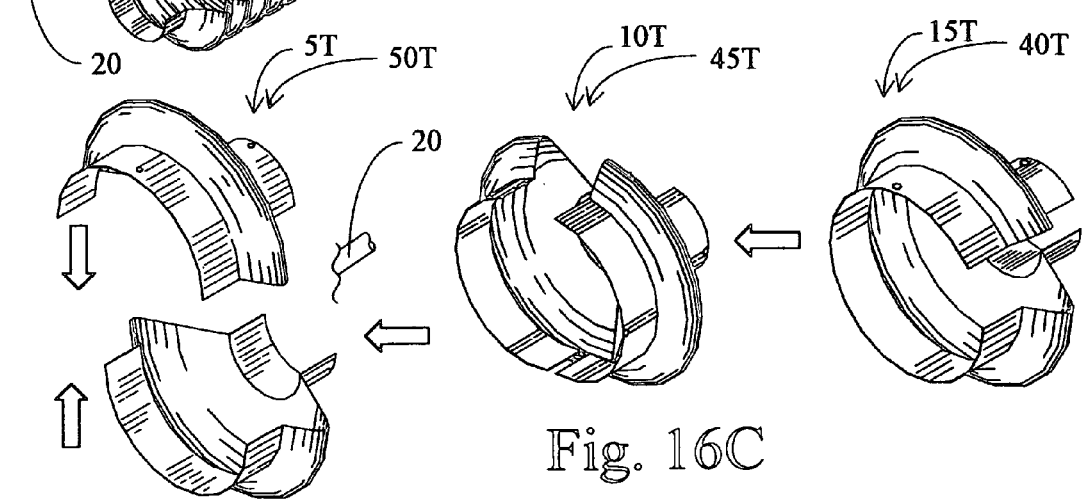
Figure 17A:
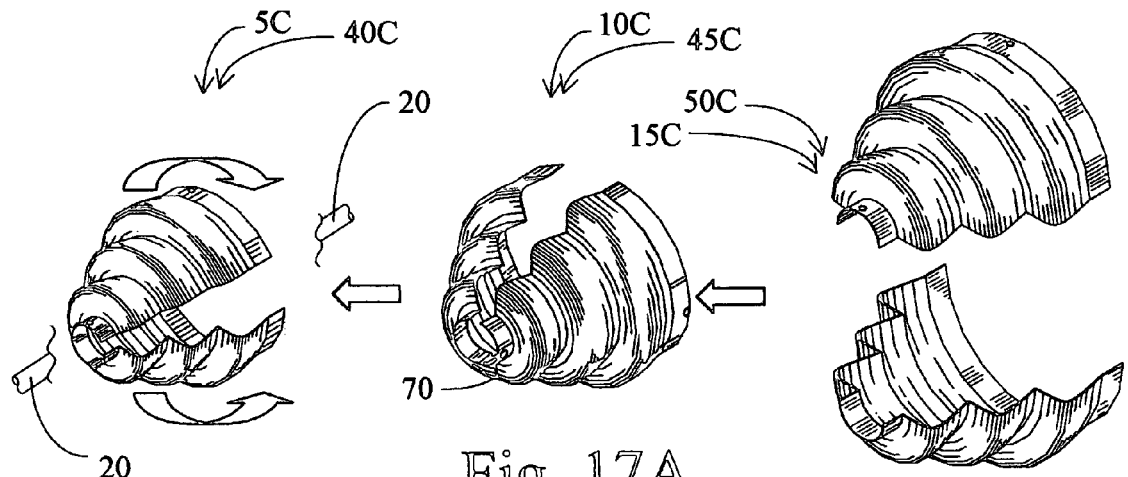
Figure 17B:
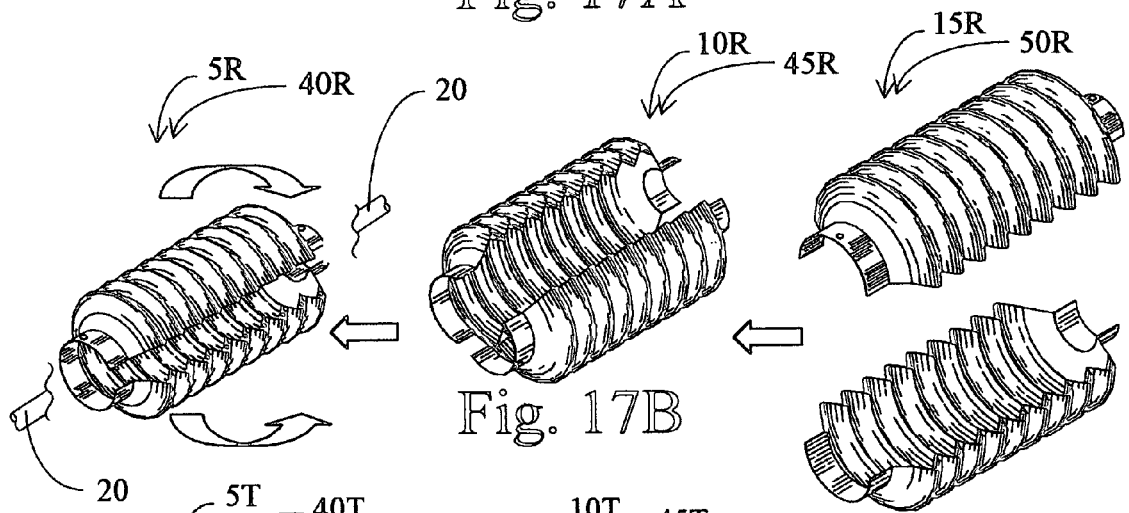
Figure 17C:
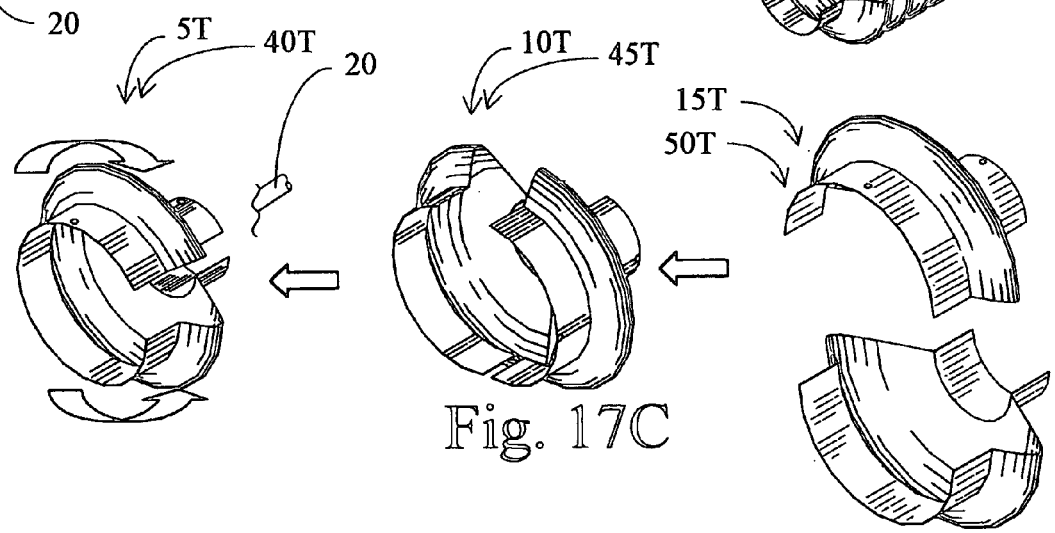

FIG. 2C shows second embodiment (as in a tie-rod boot) split boot layer assembly, in exploded view. The first, second and third split boot layers are all of halved or type 'C' cut.

FIGS. (3A through 17C) show third through seventeenth embodiment split boot layer assembly (as used in a constant velocity joint boot, in a rack-and-pinion unit's boot, and in a tie-rod boot, respectively). Unlike FIGS. 1A through 2C), it is not shown as centrally exploded view, instead is serially sequenced view of first, second and third split boot layers starting from left to right on each row. On each row, starting from leftmost split boot layer and following the block arrow going to the right, and progressively taking on each upper-layer split boot layer. First split boot layer enclosed the device to-be-protected on axle (20), next subsequent successive split boot layer then snapped, layered onto the previous, or lower-layer split boot layer (145). The first, second and third split boot layers (5C, 5R, 5T), (10C, 10R, 10T), (15C, 15R, 15T) can be of all different combinations or mix of type 'A', 'B' and 'C' cuts. The orientation of the cut (53) or slit of each upper-layer split boot layer in relationship to its preceding lower-layer split boot layer (145) underneath is instrumental to the split boot layer sealing effectiveness, further discussions will follow.

FIG. (3A, 3B, 3C) show third embodiment using first, second and third split boot layers (5C, 5R, 5T), (10C, 10R, 10T), and (15C, 15R, 15T), all of regular or type 'A' cut (40C, 40R, 40T) for constant velocity joint, rack and pinion steering column and tie-rod joint, respectively.

FIG. (4A, 4B, 4C) show fourth embodiment using first, second and third split boot layers (5C, 5R, 5T), (10C, 10R, 10T), and (15C, 15R, 15T), all of pivoted or type 'B' cut (45C, 45R, 45T) for constant velocity joint, rack and pinion steering column and tie-rod joint, respectively.

FIG. (5A, 5B, 5C) show fifth embodiment using first split boot layer (5C, 5R, 5T) with pivoted or type 'B' cut, second split boot layer (10C, 10R, 10T) and third split boot layer (15C, 15R, 15T). Both second and third split boot layers with regular or type 'A' cut for constant velocity joint, rack and pinion steering column and tie-rod joint, respectively.

FIG. (6A, 6B, 6C) show sixth embodiment using first split boot layer (5C, 5R, 5T) with regular or type 'A' cut, second split boot layer (10C, 10R, 10T) and third split boot layer (15C, 15R, 15T). Both second and third split boot layers with pivoted or type 'B' cut for constant velocity joint, rack and pinion steering column and tie-rod joint, respectively.

FIG. (7A, 7B, 7C) show seventh embodiment using first split boot layer (5C, 5R, 5T) of halved or type 'C' cut, second split boot layer (10C, 10R, 10T) and third split boot layer (15C, 15R, 15T). Both second and third split boot layers with pivoted or type 'B' cut for constant velocity joint, rack and pinion steering column and tie-rod joint, respectively.

FIG. (8A, 8B, 8C) show eighth embodiment using first split boot layer (5C, 5R, 5T) with pivoted or type 'B' cut, second split boot layer (10C, 10R, 10T) and third split boot layer (15C, 15R, 15T). Both second and third split boot layers with halved or type 'C' cut for constant velocity joint, rack and pinion steering column and tie-rod joint, respectively.

FIG. (9A, 9B, 9C) show ninth embodiment using first split boot layer (5C, 5R, 5T) and second split boot layer (10C, 10R, 10T) both with pivoted or type cut, and third split boot layer (15C, 15R, 15T) with regular or type 'A' cut. They are for constant velocity joint, rack and pinion steering column and tie-rod joint, respectively.

FIG. (10A, 10B, 10C) show tenth embodiment using first split boot layer (5C, 5R, 5T) and second split boot layer (10C, 10R, 10T) both with regular or type 'A' cut, and third split boot layer (15C, 15R, 15T) with pivoted or type 'B' cut. They are for constant velocity joint, rack and pinion steering column and tie-rod joint, respectively.

FIG. (11A, 11B, 11C) show eleventh embodiment using first split boot layer (5C, 5R, 5T) and second split boot layer (10C, 10R, 10T) both with halved or type 'C' cut, and third split boot layer (15C, 15R, 15T) with pivoted or type 'B' cut. They are for constant velocity joint, rack and pinion steering column and tie-rod joint, respectively.

FIG. (12A, 12B, 12C) show twelfth embodiment using first split boot layer (5C, 5R, 5T) and second split boot layer (10C, 10R, 10T) both with pivoted or type 'B' cut, and third split boot layer (15C, 15R, 15T) with halved or type 'C' cut. They are for constant velocity joint, rack and pinion steering column and tie-rod joint, respectively.

FIG. (13A, 13B, 13C) show thirteenth embodiment using first split boot layer (5C, 5R, 5T) with regular or type 'A' cut, second split boot layer (10C, 10R, 10T) with pivoted or type 'B' cut, and third split boot layer (15C, 15R, 15T) with regular or type 'A' cut. They are for constant velocity joint, rack and pinion steering column and tie-rod joint, respectively.

FIG. (14A, 14B, 14C) show fourteenth embodiment using first split boot layer (5C, 5R, 5T) with pivoted or type 'B' cut, second split boot layer (10C, 10R, 10T) with regular or type 'A' cut, and third split boot layer (15C, 15R, 15T) with pivoted or type 'B' cut. They are for constant velocity joint, rack and pinion steering column and tie-rod joint, respectively.

FIG. (15A, 15B, 15C) show fifteenth embodiment using first split boot layer (5C, 5R, 5T) with pivoted or type 'B' cut, second split boot layer (10C, 10R, 10T) with halved or type 'C' cut, and third split boot layer (15C, 15R, 15T) with pivoted or type 'B' cut. They are for constant velocity joint, rack and pinion steering column and tie-rod joint, respectively.

FIG. (16A, 16B, 16C) show sixteenth embodiment using first split boot layer (5C, 5R, 5T) with halved or type 'C' cut, second split boot layer (10C, 10R, 10T) with pivoted or type 'B' cut, and third split boot layer (15C, 15R, 15T) with regular or type 'A' cut. They are for constant velocity joint, rack and pinion steering column, and tie-rod joint, respectively.

FIG. (17A, 17B, 17C) show seventeenth embodiment using first split boot layer (5C, 5R, 5T) with regular or type 'A' cut, second split boot layer (10C, 10R, 10T) with pivoted or type 'B' cut, and third split boot layer (15C, 15R, 15T) with halved or type 'C' cut. They are for constant velocity joint, rack and pinion steering column, and tie-rod joint, respectively.

Figure 18A:
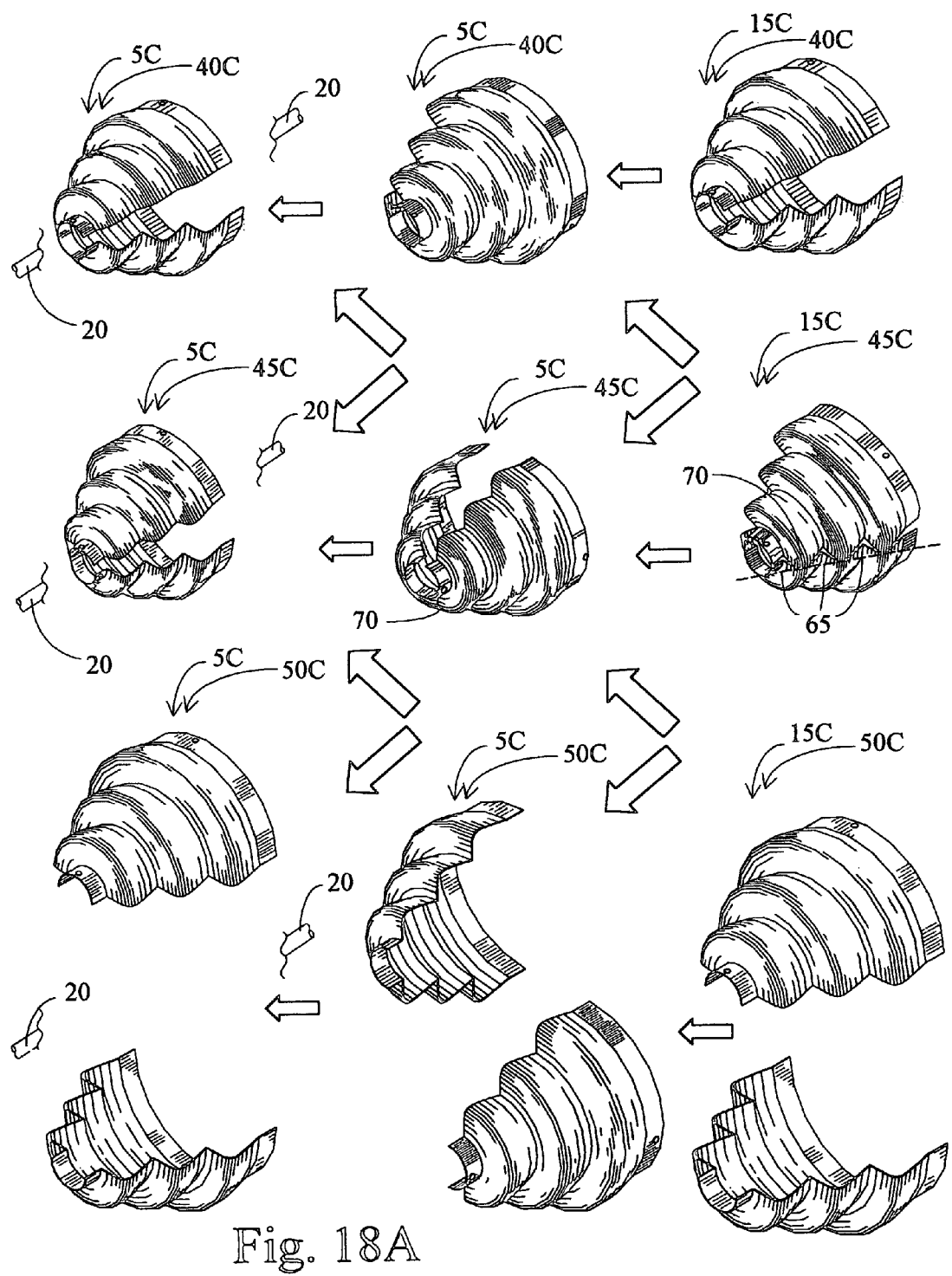
Figure 18B:
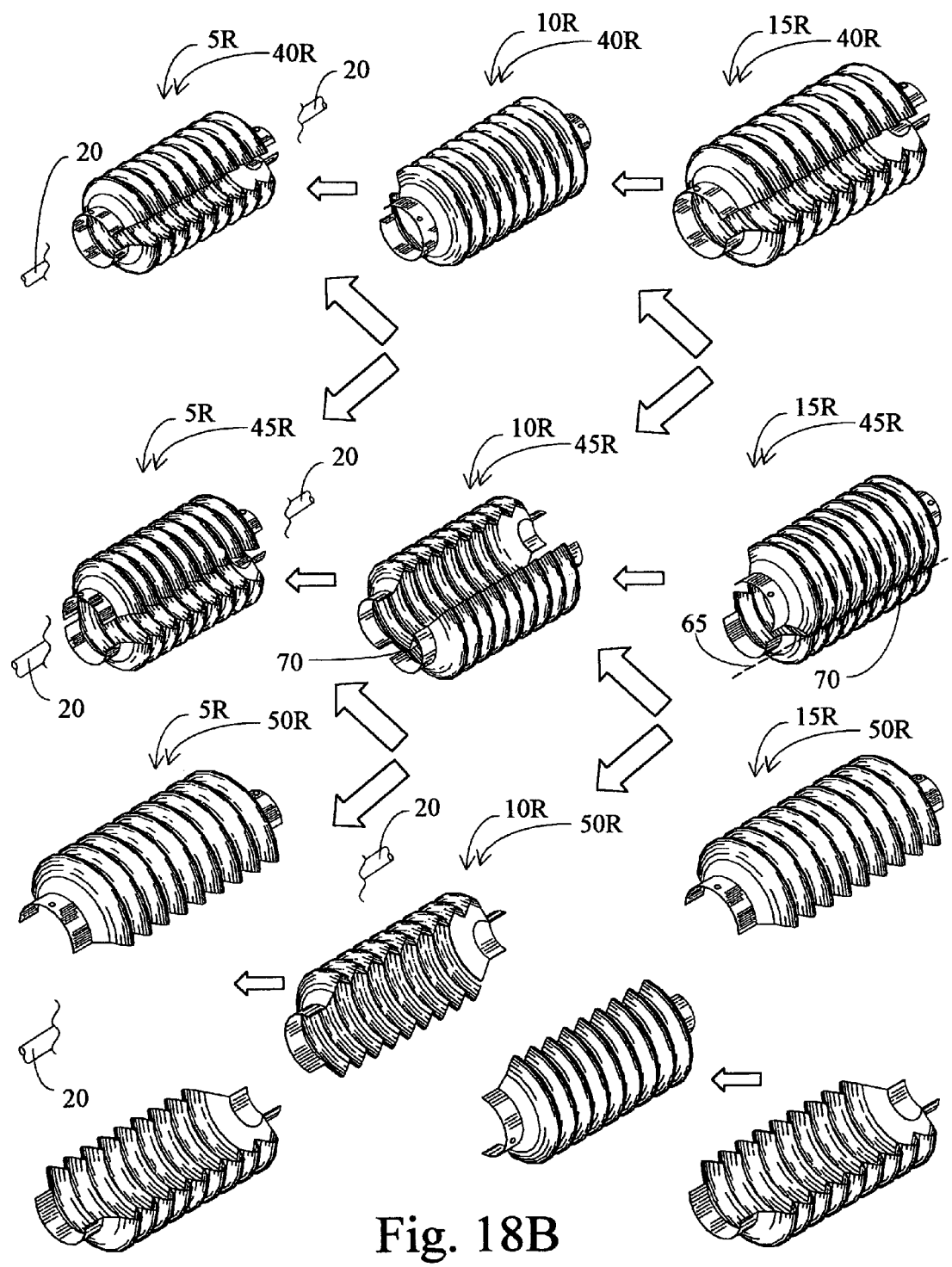
Figure 18C:
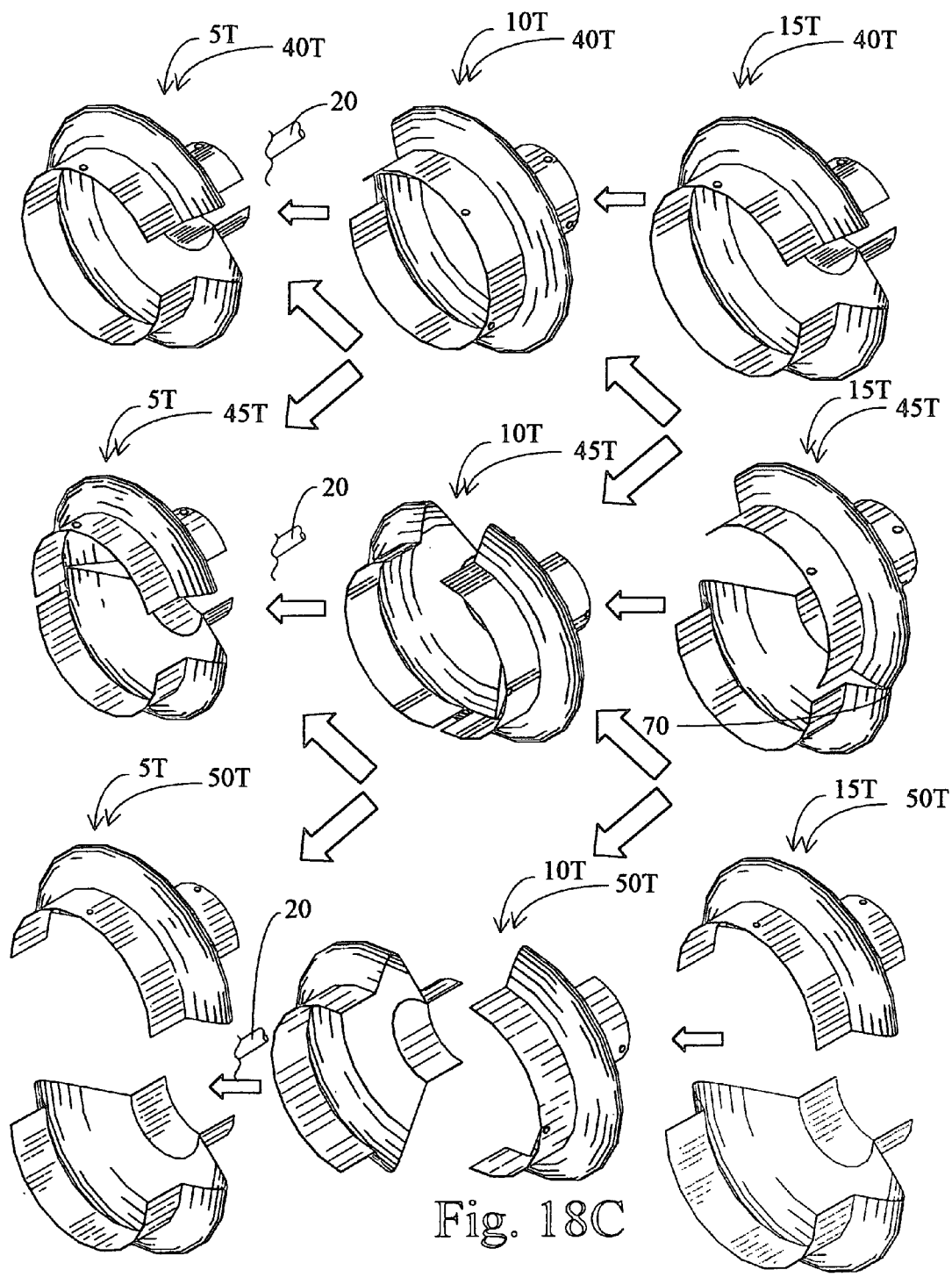

FIGS. 18A, 18B, and 18C all recap and exemplify the previously mentioned embodiments in their respective diagrams in summarized compact combination diagrams matrix formats as used in a constant velocity joint boot, in a rack-and-pinion unit's boot, and in a tie-rod joint boot, respectively.

As just mentioned, FIG. 18A shows all possible split boot layer assembly embodiments (for a constant velocity joint boot), that can be derived, using split boot layer cut types selected from the specified three cut types.

FIG. 18B shows all possible split boot layer assembly embodiments (for a rack-and-pinion boot), that can be derived from the given three cut types.

FIG. 18C shows all possible split boot layer assembly embodiments (for a tie-rod joint boot), that can be derived from the given three cut types.

The way to read or assemble together a multiple layered laminated split boot layer system from diagrams in FIGS. 18A, 18B, and 18C (the summarized compact combination diagrams matrix formats) is to start from the leftmost split boot layer. From there, laterally, horizontally, or diagonally follow each block arrow to select each split boot layer from left to right. In order to arrive at only 3-split boot layer system of my reinforced, laminated, multiple-layered, protective split boot system, select only a total of 2 block arrows (either horizontal or diagonal). This way it will end only with 3 split boot layers, glue laminated together with glue sealant adhesive sandwiched in-between those split boot layers.

Figure 19A:
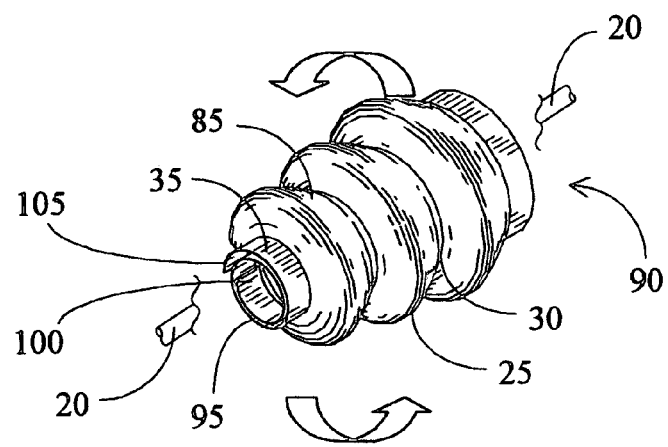

FIG. 19A shows the eighteenth embodiment split boot layer with spiral wrap around flap structure creating a multiple layered, sealant glue adhesive reinforced, laminated, integrated split boot layer assembly as used in a constant velocity joint boot.

Figure 19B:
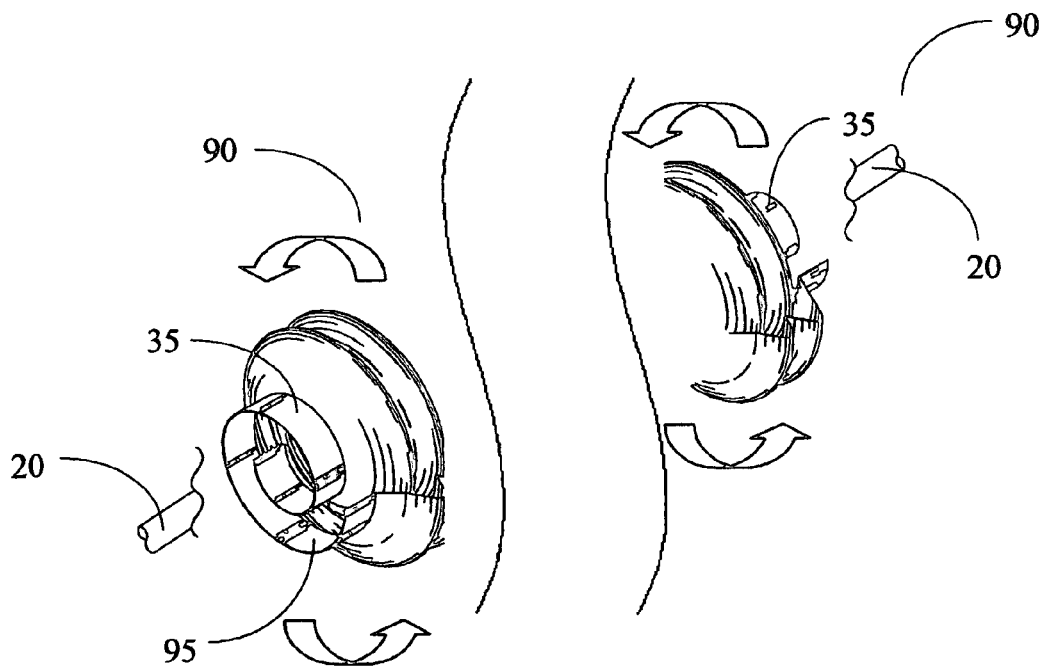

FIG. 19B shows eighteenth embodiment split boot layer with spiral wrap around flap structure creating a multiple layered, sealant glue adhesive reinforced, laminated, integrated split boot layer assembly used in a rack and pinion boot.

Figure 19C:
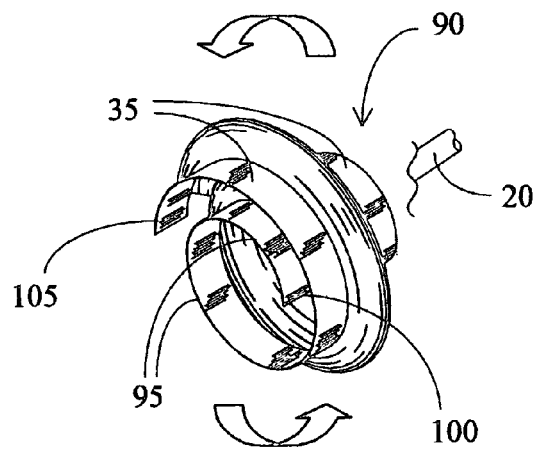

FIG. 19C shows eighteenth embodiment split boot layer with spiral wrap around flap structure creating a multiple layered, sealant glue adhesive reinforced, laminated, integrated split boot layer assembly used in a tie-rod joint boot.

Figure 20A:
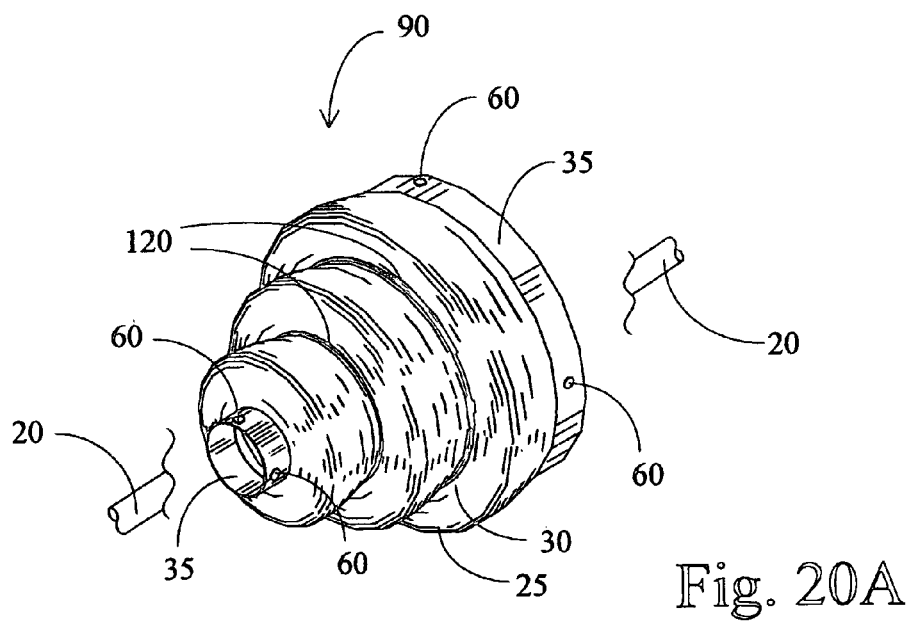

FIG. 20A shows a multiple-layered laminated split boot layer assembly system (90) as used in a constant velocity joint with lightly or loosely installed encircling reinforcing ring (120).

Figure 20B:
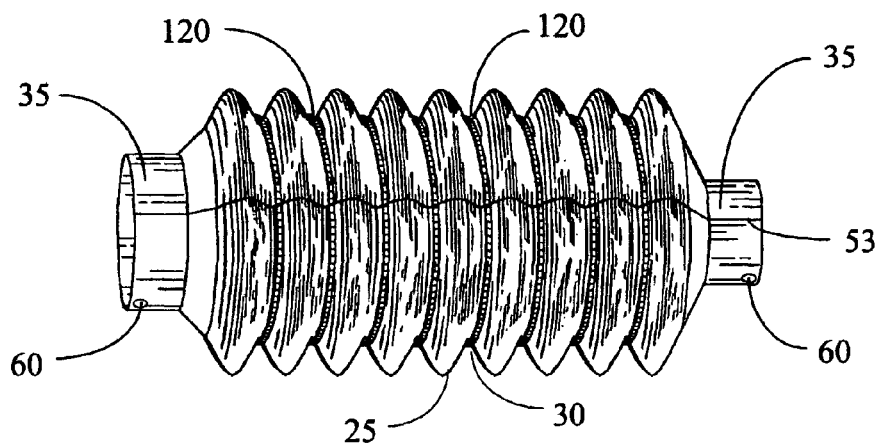

FIG. 20B shows a multiple-layered laminated split boot layer assembly system (90) as used in a rack and pinion steering split boot layer assembly with lightly or loosely installed encircling reinforcing ring (120).

Figure 20C:
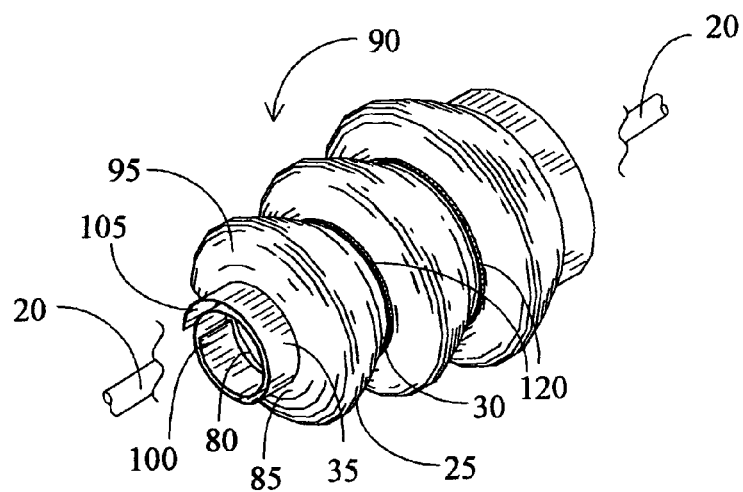

FIG. 20C shows an eighteenth embodiment of a multiple-layered split boot layer assembly to system (90) with overlapping spiral wrap around flap structure (95) as used in a constant velocity joint boot with lightly or loosely installed encircling reinforcing ring (120).

Figure 20D:
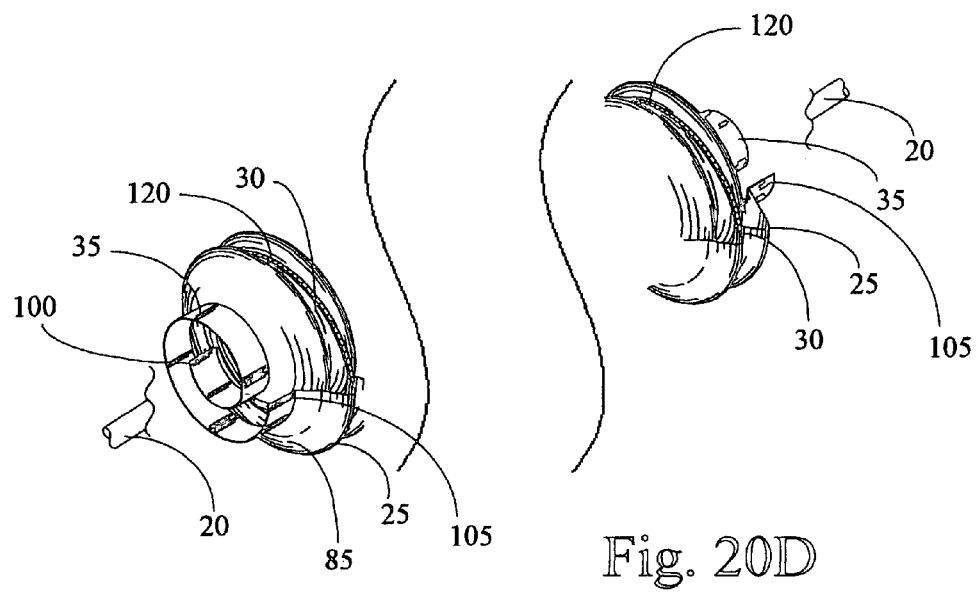

FIG. 20D shows an eighteenth embodiment of a multiple-layered split boot layer assembly system (90) with overlapping spiral wrap around flap structure (95) as used in a rack and pinion steering boot layer assembly with lightly or loosely installed encircling reinforcing ring (120).

Figure 21A:
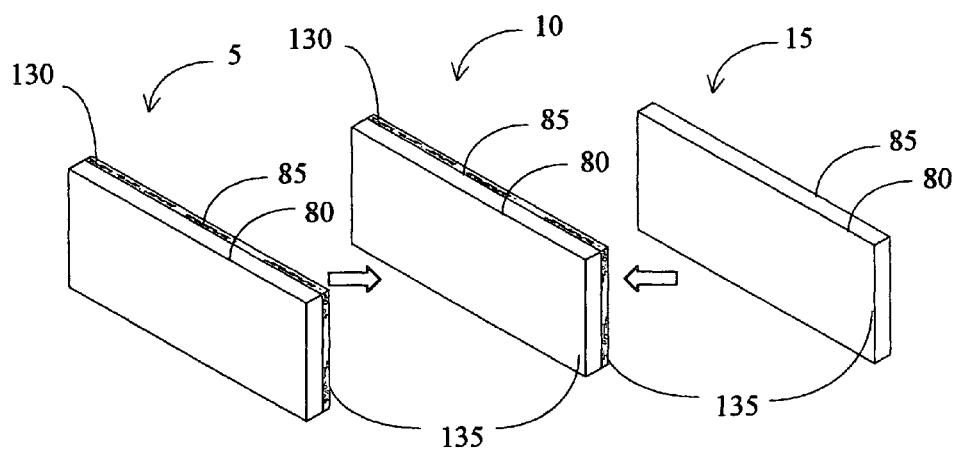

FIG. 21A shows a section of a multiple-layered split boot layer assembly system (90) with single sealant adhesive coating (135).

Figure 21B:
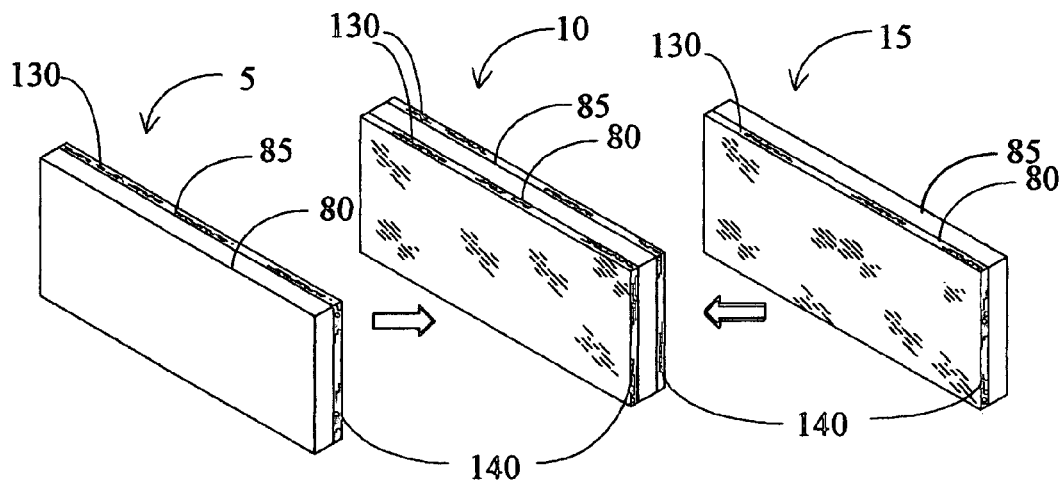

FIG. 21B shows a section of a multiple-layered laminated split boot layer assembly system (90) with dual glue sealant adhesive coatings (140).

Various modifications and variations to the embodiments herein chosen for the purpose of illustration will readily occur to those skilled in the art.

Figures 22A, 22B:
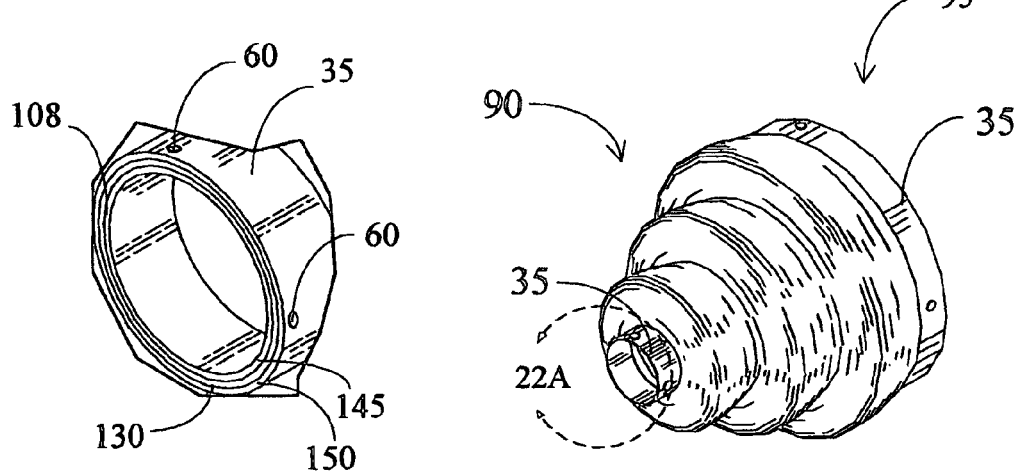

FIG. 22A is a close-up or magnified view of the sealing sleeve (35) showing 3 split boot layers of substantially equal thickness of a multiple-layered laminated split boot layer assembly system (90) shown in FIG. 22B.

FIG. 22B shows a multiple-layered laminated split boot layer assembly system as in a constant velocity joint boot, assembled with glue sealant adhesive.

Figure 23A:
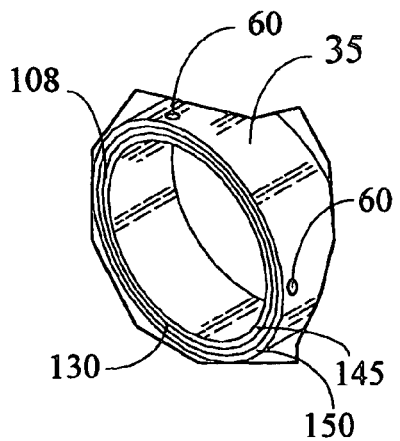
Figure 23B:
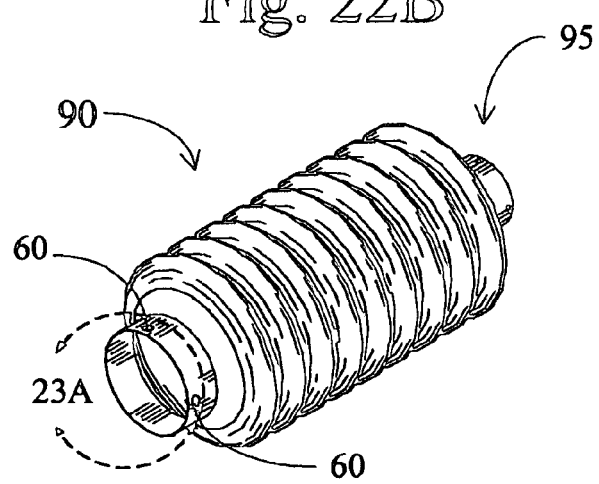

FIG. 23A is a close-up or magnified view of the sealing sleeve (35) showing 3 split boot layers of substantially equal thickness of a multiple-layered laminated split boot layer assembly system (90) shown in FIG. 23B.

FIG. 23B shows a multiple-layered laminated split boot layer assembly system as in a rack and pinion unit boot, assembled with glue sealant adhesive.

FIG. 24A is a close-up or magnified view of the sealing sleeve (35) showing 3 split boot layers of substantially equal thickness of a multiple-layered laminated split boot layer assembly system (90) shown in FIG. 24B.

FIG. 24B shows a multiple-layered laminated split boot layer assembly system as in a tie rod joint boot, assembled with glue sealant adhesive.

FIG. 25A is a close-up or magnified view of the sealing sleeve (35) showing thicker first or lowest layer topped off with 2 split boot layers of substantially equal thickness of a multiple-layered laminated split boot layer assembly system (90) shown in FIG. 25B.

FIG. 25B shows a multiple-layered laminated split boot layer assembly system as in a constant velocity joint boot, assembled with glue sealant adhesive.

FIG. 26A is a close-up or magnified view of the sealing sleeve (35) showing thicker first or lowest layer topped off with 2 split boot layers of substantially equal thickness of a multiple-layered laminated split boot layer assembly system (90) shown in FIG. 26B.

FIG. 26B shows a multiple-layered laminated split boot layer assembly system as in a rack and pinion unit boot, assembled with glue sealant adhesive.

FIG. 27A is a close-up or magnified view of the sealing sleeve (35) showing thicker first or lowest layer topped off with 2 split boot layers of substantially equal thickness of a multiple-layered laminated split boot layer assembly system (90) shown in FIG. 27B.

FIG. 27B shows a multiple-layered laminated split boot layer assembly system as in a tie rod joint boot, assembled with glue sealant adhesive.

FIG. 28A is a close-up or magnified view of the sealing sleeve (35) showing 3 split boot layers of substantially equal thickness formed with overlapping spiral wrap around flap structure (95) of a multiple-layered laminated split boot layer assembly system (90) shown in FIG. 28B.

FIG. 28B shows a multiple-layered laminated split boot layer assembly system with overlapping spiral wrap around flap structure (95) as in a constant velocity joint boot, assembled with glue sealant adhesive.

FIG. 29A is a close-up or magnified view of the sealing sleeve (35) showing 3 split boot layers of substantially equal thickness formed with overlapping spiral wrap around flap structure (95) of a multiple-layered laminated split boot layer assembly system (90) shown in FIG. 29B.

FIG. 29B shows a multiple-layered laminated split boot layer assembly system with overlapping spiral wrap around flap structure (95) as in a rack and pinion unit boot, assembled with glue sealant adhesive.

Figure 30A:
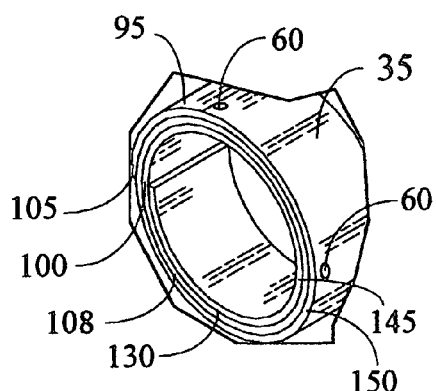
Figure 30B:
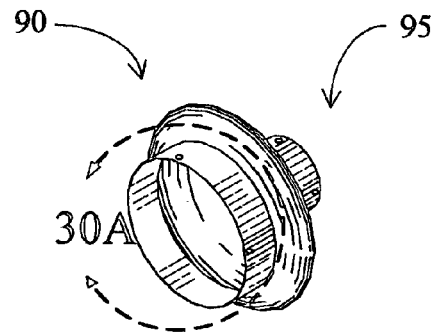

FIG. 30A is a close-up or magnified view of the sealing sleeve (35) showing 3 split boot layers of substantially equal thickness formed with overlapping spiral wrap around flap structure (95) of a multiple-layered laminated split boot layer assembly system (90) shown in FIG. 30B.

FIG. 30B shows a multiple-layered laminated split boot layer assembly system with overlapping spiral wrap around flap structure (95) as in a tie rod joint boot, assembled with glue sealant adhesive.

Figure 31A:
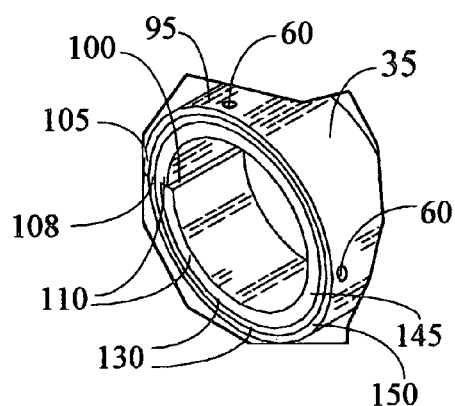

FIG. 31A is a close-up or magnified view of the sealing sleeve (35) showing thicker first lowest layer, topped off with 2 split boot layers of substantially equal thickness. All three split boot layers formed with overlapping spiral wrap around flap structure (95) of a multiple-layered laminated split boot layer assembly system (90) shown in FIG. 31B.

Figure 31B:
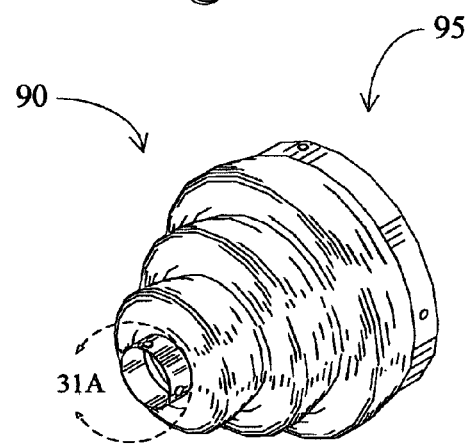

FIG. 31B shows a multiple-layered laminated split boot layer assembly system with overlapping spiral wrap around flap structure (95) as in a constant velocity joint boot, assembled with glue sealant adhesive.

Figure 32A:
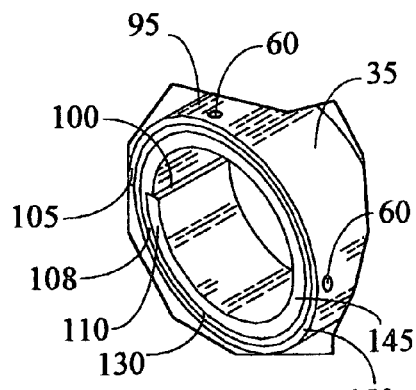

FIG. 32A is a close-up or magnified view of the sealing sleeve (35) showing thicker first lowest layer, topped off with 2 split boot layers of substantially equal thickness. All three split boot layers formed with overlapping spiral wrap around flap structure (95) of a multiple-layered laminated split boot layer assembly system (90) shown in FIG. 32B.

Figure 32B:
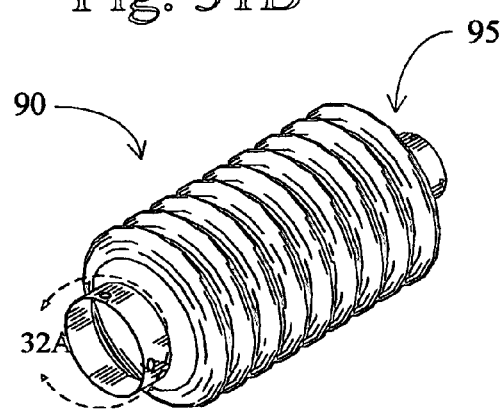

FIG. 32B shows a multiple-layered laminated split boot layer assembly system with overlapping spiral wrap around flap structure (95) as in a rack and pinion unit boot, assembled with glue sealant adhesive.

FIG. 33A is a close-up or magnified view of the sealing sleeve (35) showing thicker first lowest layer, topped off with 2 split boot layers of substantially equal thickness. All three split boot layers formed with overlapping spiral wrap around flap structure (95) of a multiple-layered laminated split boot layer assembly system (90) shown in FIG. 33B.

FIG. 33B shows a multiple-layered laminated split boot layer assembly system with overlapping spiral wrap around flap structure (95) as in a tie rod joint boot, assembled with glue sealant adhesive.

DRAWINGS

Reference Numerals 5C first split boot layer (for constant velocity joint boot)
5R first split boot layer (for rack and pinion unit boot)
5T first split boot layer (for tie rod joint boot)
10C second split boot layer (for constant velocity joint boot)
10R second split boot layer (for rack and pinion unit boot)
10T Second split boot layer (for tie rod joint boot)
15C third split boot layer (for constant velocity joint boot)
15R third split boot layer (for rack and pinion unit boot)
15T third split boot layer (for tie rod joint boot)
18 split boot layers
20 device to-be-protected on axle
25 crest
30 trough
35 sealing sleeve
40C regular or type 'A' cut (for constant velocity joint boot)
40R regular or type 'A' cut (for rack and pinion unit boot)
40T regular or type 'A' cut (for tie rod joint boot)
45C pivoted or type 'B' cut (for constant velocity joint boot)
45R pivoted or type 'B' cut (for rack and pinion unit boot)
45T pivoted or type 'B' cut (for tie rod joint boot)
50C halved or type 'C' cut (for constant velocity joint boot)
50R halved or type 'C' cut (for rack and pinion unit boot)
50T halved or type 'C' cut (for tie rod joint boot)
53 cut
55 complete cut
60 alignment guiding mark
65 pivot line of crests
70 incomplete cut
75 two split boot layer halves
80 inside surface area
85 outside surface area 90 laminated multiple-layered split boot layer assembly system
95 overlapping spiral wrap around flap structure
100 beginning flap
105 ending flap
108 regular thickness layer {as other layer(s)}
110 thicker layer (than upper-layer)
115 split boot layer's opening
120 encircling reinforcing ring
130 glue sealant adhesive coating
135 single glue sealant adhesive coating
140 dual glue sealant adhesive coatings
145 lower-layer split boot layer
150 upper-layer split boot layer

DETAILED DESCRIPTION

Preferred Embodiment

Even though three split boot layers do not always necessarily be used, however for simplicity without compromising effectiveness, only 3-split boot layer multiple-layered laminated split boot layer assembly system (90) examples will be used throughout this patent application for my revolutionary, laminated multiple-layered, split boot layer assembly system.

The first split boot layers (5C, 5R, 5T) can be of the regular thickness layer (108) as the rest of the split boot layers. However, to help with split boot layer installation, the first split boot layer can be substantially more rigid and consequently sturdier. Two ways to make it more rigid is either by using sturdier material or by thicker layer (110) to be form-keeping, whereby functioning as a base foundation for all the subsequent additional upper-layer split boot layers (10C, 10R, 10T), and (15C, 15R, 15T) to build upon. All split boot layers will then be fit glove-like, sock-like, socked, stacked and layered snuggly, dovetail like, each upper-layer split boot layer on top of the lower-layer split boot layer (145). In all our examples, we will use only thicker layer for sturdier effect, without ruling out the other possibility of use of sturdier material, instead.

Since three split boot layers will be snuggly layered one over another to be socked, gloved, dove tailed over, integrated, laminated and glued together, the upper-layer split boot layer (150) should be slightly substantially proportionally larger than lower-layer split boot layer (145). That explains why the drawings show substantially different sizes of split boot layers. Either the lower-layer split boot layer (145) is appropriately sized smaller than that of upper-layer split boot layer (150) or the size of all split boot layers are substantially the same. In the latter case, all those split boot layers will be flexible, stretchable, expandable enough to allow each upper-layer split boot layer to wrap snuggly around over its lower-layer split boot layer.

The present invention featuring a glue sealant-reinforced, multiple-layered laminated, split boot layer assembly system (90) is directed to many applications. Such hardware applications as guiding, steering, control, transmission or driving means as in CV (constant velocity) joint, universal joints or more generally transmission, guiding, control, push and pull mechanisms such as in hydraulic, or pneumatic actuator equipments, or rack & pinion unit, a tie rod and a piston-cylinder boots, etc. In fact, anything that may require full or partial dismantling of related parts in order to thread the part to be protected (be it a jointed coupling or axle (20)) through a protective boot can benefit from the present invention. Additionally, it can still enjoy higher level of split boot integrity than other split boot products currently available on the market.

FIGS. 1A, 1B and 1C all show first embodiment (as in a constant velocity joint boot, a rack and pinion unit boot, and tie rod joint boot) of my glue-fastener integrated laminated and glue-reinforced multiple-layered split boot layers system (90).

The first split boot layer (5C, 5R, 5T) encloses around the jointed coupling or device to-be-protected on axle (20). The vertical top and bottom split boot layer halves of second split boot layer (10C, 10R, 10T), with both halves (75) next enclosing around the first split boot layer (5C, 5R, 5T). Glue sealant adhesive coating is sandwiched in-between the first (5C, 5R, 5T) and second (10C, 10R, 10T) split boot layers. The third split boot layer (15C, 15R, 15T) will be on the outside of the second split boot layer (10C, 10R, 10T). Similar gluing together will be done with the final or the third split boot layer (15C, 15R, 15T) enclosing around onto the second split boot layer (10C, 10R, 10T). Utilizing the strength from reinforcing glue sealant adhesive sandwiched in-between each two split boot layers, the layers were all pressed laminated into my multiple-layered split boot layer assembly system (90).

Concerning the glue sealant adhesive coating, single glue sealant adhesive coating (135) is in-between layer glue coating on only one abutting surface areas of the two adjacent, involved split boot layers. Dual glue sealant adhesive coatings (140) is in-between layer glue coatings on both abutting surface areas of the two adjacent, involved split boot layers. Selection of either single (135) or dual glue sealant adhesive coatings (140) will depend on the need and preference of a user. Understandably, dual glue sealant adhesive coatings (140) should provide stronger bond.

Please note: in a multiple-layered laminated split boot layer assembly system (90) with flap structure (95), each split boot layer comes from the same, single physical flap structure (95). Also the adhesive sealant coating can be either pre-coated at manufacture or coated on site, meaning only at split boot layer installation. Coating can be done in many different ways of today's glue sealant adhesive application technology such as painting, spraying, or dipping, etc., just to name a few. So when the split boot layer systems are installed the single (135) or dual glue sealant adhesive coatings (140) will be sandwiched in-between those split boot layers.

The positioning of second split boot layer (10C, 10R, 10T) is critical to achieving maximized sealing performance of an integrated, laminated split boot layer system. The rationale behind the facing or orientation of the cut (53) of current (upper-layer) split boot layer (150) with respect to that of preceding (lower-layer) split boot layer (145) is to keep those cuts as far apart as possible from each other with the help of alignment guiding mark (60), the sealing effect can then be maximized.

OPERATION

Preferred Embodiment

As with many split boot installations, installation of my laminated multiple layered split boot system, is quite easy. Just open up along the cut (53) split line of the first split boot layer (5C, 5R, 5T) and then enclosing around the jointed coupling or device to-be-protected on axle (20) via the split boot layer's opening (115).

If split boot layers are not already glue sealant adhesive coated from boot manufacture time (in other words, if not pre-coated), apply the glue sealant adhesive onto the surface area of one of the two split boot layers that will come into contact, pressed against and thus abutting each other. This kind of glue coating is only a single glue sealant adhesive coating (135). If preferred having dual glue sealant adhesive coatings (140), apply the glue sealant adhesive on both the inside surface area (80) of upper split boot layer (150) as well as the outside surface area (85) of lower split boot layer (145).

Avoid applying glue sealant adhesive only where it will be directly exposed to the jointed coupling or device to-be-protected on axle (20). Also avoid applying where it will eventually form the outside surface area (85), resulting in a sticky, dirt, dust collecting outer surface of the split boot layer assembly system (90).

If preferred, optionally use some temporary holding aid (like plastic coated soft metallic wire (twist tie), or a small nylon tie) tightened around the sealing sleeve (35) to temporarily hold still and more stable, the lower-layer split boot layer (145).

As stated, the positioning of second split boot layer (10C, 10R, 10T) (as well as later the successive third split boot layer) is important to achieving maximized sealing performance of the integrated, laminated split boot layer system. We can use alignment guiding mark (60) to have the cut (53) face as far away as possible from that cut (53) of preceding split boot layer.

Enclose, embrace, sock, stack, and layer the second split boot layer (10C, 10R, 10T) around over the first split boot layer (5C, 5R, 5T), with attention given to the orientation of the cut (53) using the alignment guiding mark (60). In this preferred or first embodiment case, the cut (53) of the second split boot layer (10C, 10R, 10T) is 90 angular degrees away from that of the first split boot layer.

When the first and second split boot layer is installed surrounding the axle (20), the glue sealant adhesive will be sandwiched between the multiple layers. Next, do similarly with the final or third split boot layer (15C, 15R, 15T) to enclose and embrace around second split boot layer (10C, 10R, 10T). The cut (53) of the third split boot layer (10C, 10R, 10T) is also 90 angular degrees away from that of the second split boot layer.

With all three split boot layers now integrated, sealant adhesive sandwiched in-between, the present invention of multiple layered split boot layer assembly system is formed, laminated glued fastened together. At this stage, if some temporary holding aid (like plastic coated soft metallic wire (twist tie), or a small nylon tie) is used to tighten around the sealing sleeve (35) to help hold the first or preceding split boot layer still, that temporary stabilizing holding aid can now be removed. Finally, as in any boot installation, go on to install encircling clamps tightened properly at sealing sleeve (35). After sealant adhesive glue has appropriately cured and dried, the present invention of sealant adhesive glue fastener-reinforced, laminated, integrated, multiple-layered split boot layer assembly (90) is ready for use.

Optionally, or maybe more appropriately—optimally install the lightly or loosely installed encircling reinforcing ring (120) on each trough (30). Only if there are at least 2 troughs, can the reinforcing ring (120) be meaningfully usable. In other words, most likely the tie rod application then can not use this optional feature.

DESCRIPTION

Alternative Embodiments

There are various possibilities with regard to many different combinations and arrangements. FIGS. 2A through 17A, 2B through 17B and 2C through 17C show all the alternative embodiments, second through seventeenth embodiments (as in applications of constant velocity joint, rack and pinion unit and tie-rod control unit, respectively). The alternative embodiments are substantially similar to the first or preferred embodiment, except for different combination groupings in different orders of split boot layers with type 'A', 'B' and 'C' cuts and use of overlapping spiral wrap around flap structure (95).

They are very much similar to the preferred embodiment, in term of material, thickness, structure, the facing of the cut (53) to be as far as possible from that of the preceding split boot layers. Similarly, to help with split boot layer installation, the first split boot layer can be substantially more rigid and sturdier {one way is to have it sturdier is to make it thicker layer (110)} to be form-keeping. With this more rigidity functioning as a base foundation lower-layer split boot layers (5C, 5R, 5T) for all the subsequent successive additional upper-layer split boot layers (10C, 10R, 10T), and (15C, 15R, 15T) to build up upon. Each split boot layer will fit substantially glove-like, socked, stacked and layered snuggly each upper-layer split boot layer on top of its lower-layer split boot layer.

As mentioned above, due consideration has to be taken concerning the orientation of cut (53) split line with respect to its counterpart cut (53) split line of preceding or lower-layer split boot layer (145). As stated, the upper-layer split boot layer (150) has to be positioned with cut (53) split line lined up as far away as from that of the lower-layer split boot layer underneath to achieve maximum possible sealing performance.

Depending on the need and preference, the glue coating can be either single glue sealant adhesive coating (135) or dual glue sealant adhesive coatings (140) as stated. In a laminated multiple-layered split boot layer assembly system (90) with overlapping spiral wrap around flap structure (95), the upper-layer or lower-layer split boot layers are what spiral around the axle (20) coming from the same, single physical flap structure (95).

FIGS. 19A through 19C, all show a laminated multiple layered split boot layer system (90) with spiral wrap around flap structure (95) in eighteenth embodiment of the present invention (as used in applications such as a constant velocity joint, rack and pinion unit and tie-rod control unit, respectively).

Imaginably, with more combination more embodiments are possible with different combination selections of cut types.

Alternative Embodiments

Installing and operation of alternative embodiments (namely, second through seventeenth embodiments) of the present invention is basically similar to the first embodiment, with the exception of the eighteenth embodiment.

Installation of the last alternative eighteenth embodiment laminated multiple-layered split boot layer assembly system with overlapping spiral wrap around flap structure (95) additionally involves spiral wrapping because of overlapping spiral wrap around flap structure (95). The laminated multiple-layered split boot layer assembly system (90) with flap structure (95) having beginning flap (100) comprising regular thickness layer (108) for its entire length. The flap structure (95) can also be thicker layer (110) for a sectional length of substantially full 360 spiral angular degrees, then followed by or transitioning to thinner layer, that is regular thickness layer (108). The entire flap structure (95) eventually spiral wrap around the device to-be-protected on axle (20), terminating in ending flap (105).

The flap structure (95) can be manufactured in either clockwise or counter-clockwise spiral. It is recommended and suggested but not required to have flap structure (95) spiral wrap coiled either clockwise or anti-clockwise with respect to the rotational direction of the axle (20). This is to help prevent penetration of harmful elements (like road debris, dirt, water, etc) into the laminated multiple layered split boot layer system when the axle (20) is rotating especially in forward driving usually in high speed. The ending flap's (105) opening (glued) gap will then avoid facing the airflow generated from the rotational direction of the axle (20).

The ending flap (105) forms the outside surface area (85) of the split boot layer system, while beginning flap (100) forms the inside surface area (80). Additionally, the glue sealant adhesive coating (130) will then be sandwiched in-between the laminated multiple split boot layers, which will then be reinforced and laminated into a multiple-layered laminated split boot layer assembly system (90).

Where the overlapping spiral wrap around flap structure (95) transitions in firmness or sturdiness, say from thicker layer (110) to become regular thickness layer (108), can be used as a guiding means for the overlapping spiral wrap around flap structure (95) to spiral wrap around. Starting with the beginning flap (100) being the thicker layer (110) of substantially full 360 spiral angular degrees makes a firm, sturdier base first split boot layer. The first split boot layer (5C, 5R, 5T) can now be a base for further spiral wrapping tight around the axle (20) of the remaining thinner portion of the flap structure (95) as shown in FIGS. (31A, 31B, 31C) ending with the ending flap (105).

As with the first or preferred embodiment of my invention, for all alternative embodiments, the decision to use single glue sealant adhesive coating (135) or dual glue sealant adhesive coatings (140) is up to the user.

The invention claimed is:

1. A method of installing a split boot at a device to-be-protected on axle, comprising the steps of:
   (a) enclosing the device to-be-protected on axle by a first boot layer, wherein said first boot layer has a longitudinal slit and defines an opening to receive said device-to-be protected on axle within said first boot layer;
   (b) wrapping a second boot layer around said first boot layer after the device to-be-protected on axle is enclosed within said first boot layer, wherein said second boot layer has a longitudinal slit and defines an opening to receive said first boot layer within said second boot layer;
   (c) sealing said opening of said first boot layer by said second boot layer, wherein said second boot layer wraps around and seals with said first boot layer at a position that said longitudinal slit of said first boot layer is off-set from said longitudinal slit of said second boot layer such that an outside surface area of said first boot layer is sealed with an inside surface area of said second boot layer to seal said opening of said first boot layer by said second boot layer for enclosing said device to-be-protected on axle within said first and second boot layers; and
   (d) when said second boot layer is worn, wrapping a third boot layer, having a longitudinal slit, to seal and enclose said first boot layer while said first boot layer is remained wrapping around the device to-be-protected on axle, wherein said first boot layer is wrapped by said third boot layer that
   said second boot layer is directly enclosed and sealed by said third boot layer at a position that said longitudinal slit of said second boot layer is off-set from said longitudinal slit of said third boot layer.

2. The method, as recited in claim 1, wherein said longitudinal slit of said first boot layer is at least 90 angular degrees away from said longitudinal slit of said second boot.

3. The method, as recited in claim 2, wherein each of said boot layer has at least one crest and at least one trough for creating crest and trough formations, wherein said first boot layer is thicker than each of said second and third boot layer.

4. The method as recited in claim 3, before the step (b), further comprising a step of applying a glue sealant on at least one of said outside surface area of said first boot layer and said inside surface area of said second boot layer before said second boot layer wraps around said first boot layer to seal said outside surface area of said first boot layer with said inside surface area of said second boot layer so as to seal said opening of said first boot layer by said second boot layer.

5. The method, as recited in claim 4, wherein said first boot layer further has an alignment means comprising at least one alignment guiding mark provided at a substantially visible appropriate location and being orientated to face a substantially number of angular degrees away from said longitudinal slit of said first boot layer for positioning, layering, and mounting said corresponding boot layer so as to increases a sealing performance between each two boot layers.

6. The method as recited in claim 5, before the step (b), further comprising a step of encircling at least one reinforcing ring with said first boot layer to retain said first boot layer in position.

7. The method, as recited in claim 1, wherein each of said boot layer has at least one crest and at least one trough for creating crest and trough formations, wherein said first boot layer is thicker than each of said second and third boot layer.

8. The method as recited in claim 7, before the step (b), further comprising a step of applying a glue sealant on at least one of said outside surface area of said first boot layer and said inside surface area of said second boot layer before said second boot layer wraps around said first boot layer to seal said outside surface area of said first boot layer with said inside surface area of said second boot layer so as to seal said opening of said first boot layer by said second boot layer.

9. The method, as recited in claim 8, wherein said first boot layer further has an alignment means comprising at least one alignment guiding mark provided at a substantially visible appropriate location and being orientated to face a substantially number of angular degrees away from said longitudinal slit of said first boot layer for positioning, layering, and mounting said corresponding boot layer so as to increases a sealing performance between each two boot layers.

10. The method as recited in claim 9, before the step (b), further comprising a step of encircling at least one reinforcing ring with said first boot layer to retain said first boot layer in position.

* * * * *